United States Patent
Tojo

(10) Patent No.: US 9,202,126 B2
(45) Date of Patent: Dec. 1, 2015

(54) OBJECT DETECTION APPARATUS AND CONTROL METHOD THEREOF, AND STORAGE MEDIUM

(71) Applicant: CANON KABUSHIKI KAISHA, Tokyo (JP)

(72) Inventor: Hiroshi Tojo, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 13/963,690

(22) Filed: Aug. 9, 2013

(65) Prior Publication Data

US 2014/0056473 A1 Feb. 27, 2014

(30) Foreign Application Priority Data

Aug. 22, 2012 (JP) .................. 2012-183596

(51) Int. Cl.
- *G06K 9/00* (2006.01)
- *G06K 9/32* (2006.01)
- *G06T 7/00* (2006.01)

(52) U.S. Cl.
CPC ............ *G06K 9/3241* (2013.01); *G06T 7/0042* (2013.01); *G06T 2207/10016* (2013.01); *G06T 2207/10024* (2013.01); *G06T 2207/20144* (2013.01)

(58) Field of Classification Search
CPC combination set(s) only.
See application file for complete search history.

(56) References Cited

U.S. PATENT DOCUMENTS

| | | | |
|---|---|---|---|
| 7,418,134 B2 * | 8/2008 | Schwartz et al. | 382/173 |
| 7,680,339 B2 | 3/2010 | Tojo | |
| 7,720,283 B2 * | 5/2010 | Sun et al. | 382/173 |
| 7,751,589 B2 * | 7/2010 | Bovyrin et al. | 382/103 |
| 8,320,666 B2 * | 11/2012 | Gong | 382/164 |
| 8,699,852 B2 * | 4/2014 | Jiang et al. | 386/241 |
| 2005/0073585 A1 * | 4/2005 | Ettinger et al. | 348/155 |
| 2007/0237387 A1 * | 10/2007 | Avidan et al. | 382/159 |
| 2010/0234007 A1 * | 9/2010 | Shao | 455/418 |
| 2011/0038536 A1 * | 2/2011 | Gong | 382/164 |
| 2011/0051993 A1 * | 3/2011 | Caballero et al. | 382/100 |
| 2013/0271667 A1 | 10/2013 | Tojo | |

FOREIGN PATENT DOCUMENTS

JP 2003-346156 A 12/2003

OTHER PUBLICATIONS

Li, et al. "Abandoned Objects Detection Using Double Illumination Invariant Foreground Masks", IEEE, pp. 436-439 (Aug. 23, 2010).*

(Continued)

*Primary Examiner* — Anand Bhatnagar
(74) *Attorney, Agent, or Firm* — Fitzpatrick, Cella, Harper & Scinto

(57) ABSTRACT

The object detection apparatus prevents or eliminates detection errors caused by changes of an object which frequently appears in a background. To this end, an object detection apparatus includes a detection unit which detects an object region by comparing an input video from a video input device and a background model, a selection unit which selects a region of a background object originally included in a video, a generation unit which generates background object feature information based on features included in the background object region, and a determination unit which determines whether or not the object region detected from the input video is a background object using the background object feature information.

12 Claims, 22 Drawing Sheets

(56) References Cited

OTHER PUBLICATIONS

European Search Report dated Jan. 23, 2015 in European Patent Application No. 13004034.8.
Stauffer, et al. "Adaptive background mixture models for real-time tracking", IEEE, vol. 2, pp. 246-252 (Jun. 23, 1999).
Yang, et al. "Adaptive Background Modeling for Effective Ghost Removal and Robust Left Object Detection" IEEE, pp. 1-6 (Aug. 11, 2010).
D.G. Lowe, "Object recognition from local scale—invariant features", Proc. of IEEE International Conference on Computer Vision (ICCV), pp. 1150-1157, 1999.
N. Dalal and B. Triggs, "Histogram of Gradients for Human Detection", Computer Vision and Pattern Recognition, vol. 1, pp. 886-893, 2005.
Y. Nakagawa, T. Takahashi, Y. Mekada, I. Ide, and H. Murase, "Landmark symbol detection in real environment by multi-template generation," Proceedings of Dynamic Image Processing for Real Application workshop (DIA2008), pp. 259-264, 2008.
J. Sivic and A. Zisserman, "Video google: A text retrieval approach to object matching in videos", Proc. ICCV, 2003.
M.J. Swain and D.H. Ballard, "Color Indexing", International Journal of Computer Vision, vol. 7, No. 1, pp. 11-32, 1991.

* cited by examiner

F I G. 5

| BACKGROUND MODEL MANAGEMENT INFORMATION | COORDINATE | POINTER TO STATE | |
|---|---|---|---|
| | (0, 0) | 1200 | |
| | (1, 0) | 1202 | |
| | ⋮ | ⋮ | |

| POSITION-DEPENDENT BACKGROUND MODEL INFORMATION | STATE NUMBER | FEATURE AMOUNT | TIME OF CREATION | ACTIVE FLAG |
|---|---|---|---|---|
| ADDRESS 1200 | 1 | 100 | 0 | 1 |
| ADDRESS 1201 | 2 | 230 | 101 | 0 |
| ADDRESS 1202 | 1 | 10 | 0 | 0 |
| ADDRESS 1203 | 2 | 200 | 180 | 1 |
| ⋮ | ⋮ | ⋮ | ⋮ | ⋮ |

FIG. 7

| COORDINATE | STATE NUMBER | INPUT FEATURE AMOUNT | TIME OF CREATION |
|---|---|---|---|
| (0, 0) | 1 | 105 | 0 |
| (1, 0) | 2 | 203 | 180 |
| (3, 0) | 0 | 240 | 316 |
| ... | ... | ... | ... |

FIG. 9

| COORDINATE | FOREGROUND FLAG | DURATION |
|---|---|---|
| (0, 0) | 0 | 9000 |
| (1, 0) | 1 | 180 |
| ⋮ | ⋮ | ⋮ |

FIG. 11

| OBJECT REGION UPPER LEFT COORDINATE | OBJECT REGION LOWER RIGHT COORDINATE | AVERAGE DURATION |
|---|---|---|
| (10, 15) | (40, 75) | 10 |
| (80, 16) | (110, 74) | 100 |

F I G. 14

| SCENE ID | NUMBER OF DETERMINATION CONDITIONS | DETERMINATION CONDITION START POINTER | NUMBER OF PARAMETERS | PARAMETER START POINTER | ADOPTION CONDITION |
|---|---|---|---|---|---|
| 1 | 2 | 1400 | 1 | 1450 | ONLY |
| 2 | 1 | 1401 | 0 | NULL | ALL |
| ... | | | | | ... |

| | DETERMINATION CONDITION ID |
|---|---|
| ADDRESS 1400 | |
| ADDRESS 1401 | |

| | PARAMETER VALUE |
|---|---|
| ADDRESS 1450 | 100 |
| ADDRESS 1451 | 200 |

F I G. 15

| BACKGROUND OBJECT ID | OBJECT REGION UPPER LEFT COORDINATE | OBJECT REGION LOWER RIGHT COORDINATE |
|---|---|---|
| 1 | (10, 15) | (40, 75) |
| 2 | (80, 16) | (110, 74) |

FIG. 17

| SCENE ID | FEATURE AMOUNT TYPE |
|---|---|
| 1 | FEATURE AMOUNT 1 |
| 2 | FEATURE AMOUNT 2 |
| ⋮ | ⋮ |

FIG. 18

| | BACKGROUND OBJECT ID | NUMBER OF FEATURE AMOUNTS | FEATURE AMOUNT POINTER |
|---|---|---|---|
| | 1 | 100 | 18100 |
| | 2 | 80 | 18200 |
| | ⋮ | ⋮ | ⋮ |
| | COORDINATE | FEATURE AMOUNT | |
| ADDRESS 18100 | (15, 20) | (100, 20, 35, ⋯, 50) | |
| ADDRESS 18101 | (17, 32) | (20, 20, 55, ⋯, 10) | |
| | ⋮ | ⋮ | |

|  | SCENE ID | NUMBER OF DETERMINATION CONDITIONS | DETERMINATION CONDITION START POINTER |
|---|---|---|---|
|  | 1 | 2 | 2100 |
|  | 2 | 1 | 2102 |
|  | ⋮ | ⋮ | ⋮ |
|  | DETERMINATION CONDITION ID | | |
| ADDRESS 2100 | | | 21 |
| ADDRESS 2101 | | | 22 |
| ADDRESS 2102 | | | 21 |
|  | ⋮ | | |

|  | BACKGROUND OBJECT ID | NUMBER OF FEATURE AMOUNTS | FEATURE AMOUNT POINTER |
|---|---|---|---|
|  | 1 | 100 | 53100 |
|  | 2 | 80 | 53200 |
|  | ⋮ | ⋮ | ⋮ |
|  | COORDINATE | FEATURE AMOUNT | WEIGHT |
| ADDRESS 53100 | (15, 20) | (100, 20, 35,⋯, 50) | 0.2 |
| ADDRESS 53101 | (17, 32) | (20, 20, 55,⋯, 10) | 0.7 |
|  | ⋮ | ⋮ | ⋮ |

OBJECT DETECTION APPARATUS AND CONTROL METHOD THEREOF, AND STORAGE MEDIUM

BACKGROUND OF THE INVENTION

1. Field of the Invention

The present invention relates to a object detection apparatus and control method thereof.

2. Description of the Related Art

As a technique for detecting an object from an image captured by a camera, a background subtraction method is known. In the background subtraction method, a fixed camera captures, in advance, an image of a background from which an object to be detected is removed, and stores feature amounts extracted from that image as a background model. After that, differences between feature amounts extracted from an image input from the camera and those in the background model are calculated, and a different region is detected as a foreground (object).

In this case, for example, an object such as a chair in a waiting room will be examined. The chair originally exists in the waiting room, and is not an object to be detected such as a person or a bag brought in by a person. However, people frequently moves the chair or changes its direction. If such change takes place, differences from the background model are generated, and the background subtraction method erroneously detects such change as an object.

In the present specification, an object such as a chair which originally exists in a background will be referred to as a background object hereinafter.

Hence, in Japanese Patent Laid-Open No. 2003-346156 (to be referred to as a literature hereinafter), after a change region from the background model is detected, the following processing is executed to distinguish the background object or a new object brought in a visual field, thereby preventing any detection errors. Feature amounts (color features and edge features) of a region corresponding to the change region of an input image are compared with those of a region corresponding to the change region of a background image generated from the background model, and if these feature amounts are similar to each other, it is determined that the background object is moved.

However, the technique according to the above literature erroneously detects a case in which new features which are not included in the background model appear upon movement or change of the background object. That is, since features of an input image are no longer similar to those included in the background image generated from the background model, a change of the background object is not determined. For example, when a red vase is placed in front of a blue wall, and a chair is placed in front of the red vase, features of the red vase are not included in the background model since the red vase is occluded behind the chair. When the chair is moved at this time, the occluded red vase appears in a video. In case of a chair, a backrest of which is rotated, when the backrest is rotated (out-of plane rotation), new features of the chair itself, which are not included in the background model, appear in a video. In this manner, new features which do not exist so far normally appear upon movement or rotation of the background object. That is, the above literature cannot sufficiently suppress any detection errors caused by a change of the background object.

SUMMARY OF THE INVENTION

The present invention has been made in consideration of the aforementioned problems. Then, the present specification provides a technique which can prevent or reduce detection errors caused by a change of an object in a background, which object appears frequently.

In order to achieve this object, for example, an object detection apparatus according to the present specification comprises the following arrangement. That is, this specification in its first aspect provides an object detection apparatus comprising: a video input unit configured to input a video; an object region detection unit configured to detect an object region by comparing the input video and a background model; a selection unit configured to select a region of a background object originally included in a video; a generation unit configured to generate background object feature information based on features included in the background object region; and a determination unit configured to determine whether or not the object region detected from the input video is a background object using the background object feature information.

This specification in its second aspect provides a control method of controlling an object detection apparatus which comprises a video input unit configured to input a video, and detects an object in the video, comprising: an object region detection step of detecting an object region by comparing an input video from the video input unit and a background model; a selection step of selecting a region of a background object originally included in a video; a generation step of controlling a generation unit to generate background object feature information based on features included in the background object region; and a determination step of determining whether or not the object region detected from the input video is a background object using the background object feature information.

According to the present specification, detection errors caused by a change of an object in a background, which object appears frequently, can be prevented or reduced.

Further features of the present invention will become apparent from the following description of exemplary embodiments (with reference to the attached drawings).

BRIEF DESCRIPTION OF THE DRAWINGS

FIG. 5 is a table showing an example of a background model;

FIG. 7 is a table showing an example of comparison result information;

FIG. 9 is a table showing an example of foreground/background information;

FIG. 11 is a table showing an example of object region information;

FIG. 14 is a table showing an example of first scene-dependent background object region selection rules;

FIG. 15 is a table showing an example of background object candidate region information;

FIG. 17 is a table showing an example of scene-dependent feature amount type information;

FIG. 18 is a table showing an example of feature amount information;

DESCRIPTION OF THE EMBODIMENTS

Embodiments according to the present invention will be described in detail hereinafter with reference to the accompanying drawings.

Figure 1:
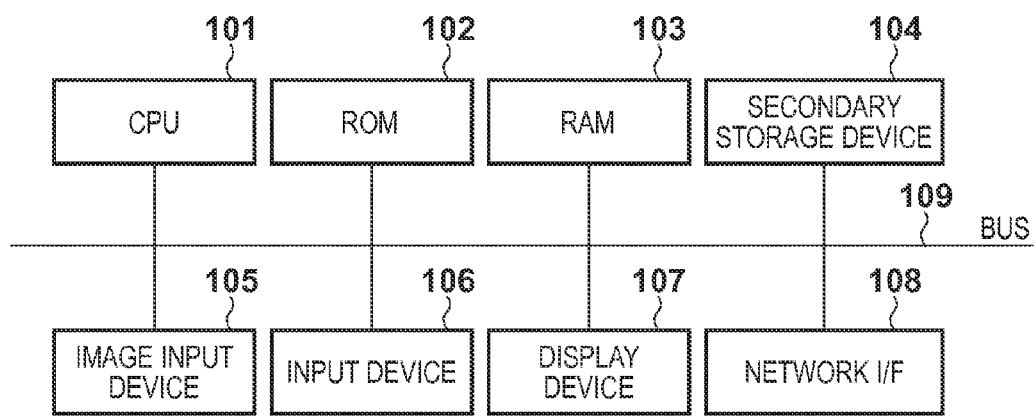
FIG. 1 is a block diagram showing the hardware arrangement of an object detection apparatus according to an embodiment.

FIG. 1 is a block diagram showing the hardware arrangement of an image processing apparatus for executing object detection (to be referred to as an object detection apparatus hereinafter) according to this embodiment. The object detection apparatus of this embodiment has the following arrangement.

A CPU 101 executes instructions according to programs stored in a ROM 102 and RAM 103. The ROM 102 is a nonvolatile memory, and stores programs of the present invention, and programs and data required for other kinds of control. The RAM 103 is a volatile memory, and stores temporal data such as frame image data and a pattern discrimination result. A secondary storage device 104 is a rewritable secondary storage device such as a hard disk drive or flash memory, and stores an OS (Operating System), image information, an object detection program, various setting contents, and the like. These pieces of information are transferred to the RAM 103, are executed as a program of the CPU 101, and are used as data.

An image input device 105 includes a digital video camera, network camera, infrared camera, or the like, and outputs a video captured by an imaging unit as digital image data. An input device 106 includes a keyboard, mouse, and the like, and allows the user to make inputs. A display device 107 includes a CRT, liquid crystal display, or the like, and displays a processing result and the like for the user. A network I/F 108 includes a modem and LAN used to establish connection to a network such as the Internet or intranet. A bus 109 connects these components to allow them to mutually exchange data.

The apparatus of this embodiment is implemented as an application which runs on the OS.

Figure 2:
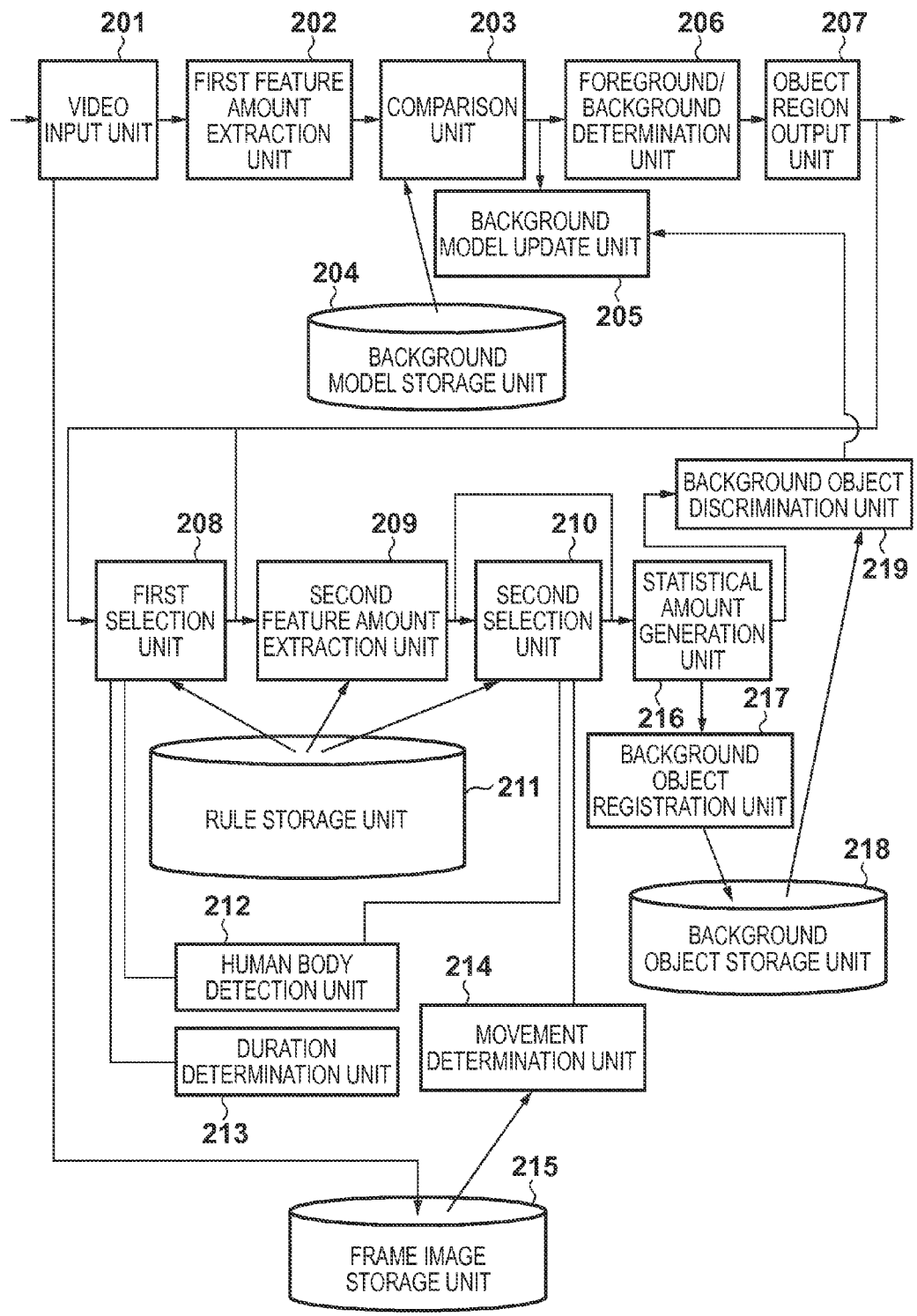
FIG. 2 is a block diagram showing the functional arrangement of the object detection apparatus according to the embodiment.

FIG. 2 is a block diagram showing the functional arrangement of the object detection apparatus of this embodiment. Processing units to be described below are implemented when the CPU 101 executes programs, but some or all of these processing units may be implemented as hardware.

Reference numeral 201 denotes a video input unit, which includes the image input device 105, and inputs a video. Reference numeral 202 denotes a first feature amount extraction unit, which extracts feature amounts required to build a background model (to be described later) from a video. Reference numeral 203 denotes a comparison unit, which compares a background model read out from a background model storage unit 204 (to be described below) and an input video. Reference numeral 204 denotes a background model storage unit, which includes the RAM 103 or secondary storage device 104, and stores a background model (to be described in detail later) which represents states at respective positions in a video using image feature amounts. Reference numeral 205 denotes a background model update unit, which updates the background model stored in the background model storage unit 204 based on the output from the comparison unit 203. Reference numeral 206 denotes a foreground/background determination unit, which determines based on the output from the comparison unit 203 whether each position in an input video corresponds to a foreground or background. Reference numeral 207 denotes an object region output unit, which combines and outputs detection results for respective object regions based on the output from the background/foreground determination unit 206.

Reference numeral 208 denotes a first selection unit which classifies object regions as outputs of the object region output unit 207 into regions which include background objects and those which do not include any background objects. Reference numeral 209 denotes a second feature amount extraction unit, which extracts feature amounts required to generate background object feature information (to be described later) from background object candidate regions as outputs of the first selection unit 208. Reference numeral 210 denotes a second selection unit, which narrows down background object candidate regions selected by the first selection unit 208 to partial regions including only background objects.

Reference numeral 211 denotes a rule storage unit, which stores scene-dependent background object region selection rules, that is, rules required to select background object regions for respective scenes (a waiting room, an entrance with an automatic door, etc.) where the object detection apparatus is equipped (to be described in detail later). The first determination unit 208, second feature amount extraction unit 209, and second selection unit 210 select background objects according to a predetermined rule with reference to information stored in this rule storage unit 211.

Reference numeral 212 denotes a human body detection unit which detects a human body region included in a video. This unit is called from the first selection unit 208 and second selection unit 210 according to the scene-dependent background object selection rule. Reference numeral 213 denotes a duration determination unit, which determines based on the output results of the object region output unit 207 whether or not duration of each object region satisfies a predetermined condition. This unit is called from the first selection unit 208 according to the scene-dependent background object selection rule.

Reference numeral 214 denotes a movement determination unit, which determines whether a region selected as a background object is generated by parallel translation or out-of-plane rotation of the background object. This movement determination unit 214 is called from the second selection unit 210 according to the scene-dependent background object selection rule. Reference numeral 215 denotes a frame image storage unit, which temporarily stores a video input by the video input unit 201. This storage unit is used by the movement determination unit 214. Reference numeral 216 denotes a statistical amount generation unit, which generates a statistical amount based on second feature amounts included in a selected background object region. Reference numeral 217 denotes a background object registration unit, which registers the statistical amount generated by the statistical amount generation unit 216 as background object feature information. Reference numeral 218 denotes a background object storage unit, which stores background object feature information (to be described in detail later). Reference numeral 219 denotes a background object discrimination unit, which determines with reference to the background object feature information whether or not a detected object is a background object. The determination result is fed back to the background model update unit 205.

The processing of the object detection apparatus according to this embodiment roughly includes a registration phase for registering a background object, and an operation phase for detecting an object. The registration phase is executed in an initial stage when the object detection apparatus is set, and parallel to the operation phase. These phases will be separately described below.

[Registration Phase]

Figure 3:
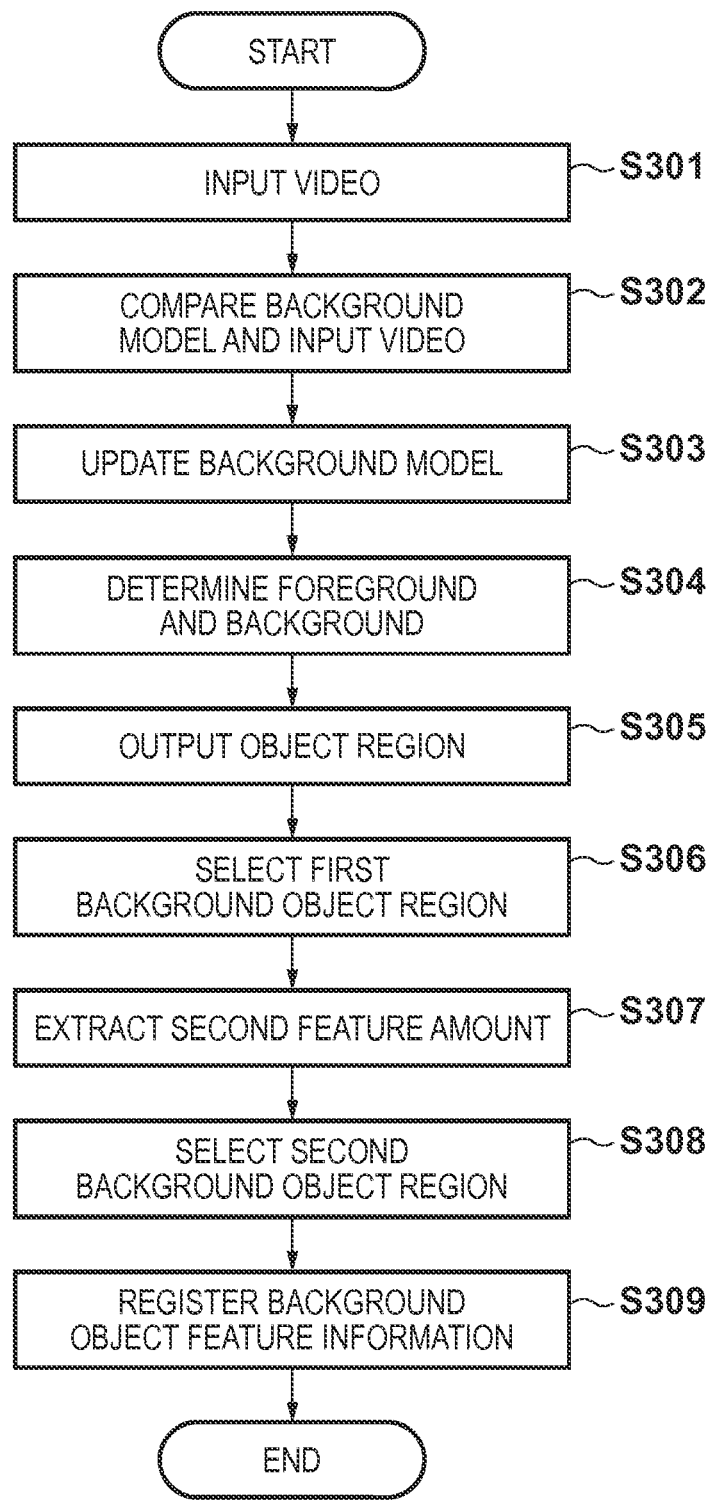
FIG. 3 is a flowchart showing the sequence of processing in a registration phase according to the embodiment.

The processing sequence for one frame image of the registration phase of this embodiment will be described below with reference to FIG. 3. FIG. 3 shows the processing sequence of a part related to the registration phase of the application to be executed by the CPU 101.

A video captured by the video input unit 201 is input, and a frame image is obtained for each predetermined time (step S301).

Next, the first feature amount extraction unit 202 extracts feature amounts from the frame image, and the comparison unit 203 compares the feature amounts in the frame image with those in a background model, which are read out from the background model storage unit 204 (step S302). (Details will be described later.)

Next, the background model update unit 205 reflects the result of the comparison unit 203 to the background model, thus updating the background model (step S303). (Details will be described later.)

Next, the foreground/background determination unit 206 determines a foreground and background based on duration from the result of the comparison unit 203 (step S304). (Details will be described later.)

Next, detected object regions are output (step S305). The output object regions are used in an abandoned object detection apparatus or the like, which detects an abandoned object. (Details will be described later.)

Next, the first selection unit 208 selects first background object regions used to select regions including background objects from the detected object regions (step S306). (Details will be described later.)

Next, the second feature amount extraction unit 209 extracts feature amounts from the selected background object regions (step S307). (Details will be described later.)

Next, the second selection unit 210 selects second background object regions used to further narrow down from the regions including background objects selected by the first selection unit 208 to regions of only background objects (step S308). (Details will be described later.)

Finally, the statistical amount generation unit 216 generates a statistical amount from feature amounts included in the regions selected as background object regions, and the background object registration unit 217 registers background object feature information in the background object storage unit 218 (step S309). (Details will be described later.)

Details of the comparison processing (comparison unit 203) in step S302 of the aforementioned processing will be described below with reference to FIG. 4.

The first feature amount extraction unit 202 extracts image feature amounts as values which represent states of respective positions from an input frame image acquired by the video input unit 201 (step S401). Examples of image feature amounts include brightness values, colors, edges, and the like, but the present invention is not particularly limited to these feature amounts. Also, feature amounts for respective pixels or those for respective partial regions may be extracted. As an example of a feature amount for each partial region, an average brightness value, DCT coefficients, and the like of pixels in a block of 8 pixels×8 pixels are enumerated. The DCT coefficients correspond to Discrete Cosine Transform results. When an input frame image is compression-encoded by JPEG, feature amounts have already been extracted at the time of image compression. Therefore, in this case, DCT coefficients may be directly extracted from a JPEG input frame image, and may be used as feature amounts. In this embodiment, feature amounts are brightness values for respective pixels. Note that an upper left pixel of a frame pixel is defined as a start point, and the following processing is executed while moving a pixel position from the left to the right, and then to each lower row (a raster scan order).

Next, position-dependent background model information of a position of interest is read out from a background model stored in the background model storage unit 204, and is temporarily stored in the RAM 103 (step S402).

The background model stored in the background model storage unit 204 will be described below with reference to FIG. 5. The background model expresses states of respective positions in a frame image using image feature amounts. The background model includes two types of information: background model management information and position-dependent background model information.

The background model management information includes position information and a pointer to position-dependent background model information at each position. The position information may assume a value which expresses a pixel position of a frame image using X-Y coordinates, or may be a number of each block of 8×8 pixels assigned in a raster scan order. Note that in this embodiment, the position information assumes a value which expresses a pixel position of a frame image using X-Y coordinates.

The position-dependent background model information holds a plurality of states corresponding to each position. Note that a state is represented by a feature amount. Therefore, non-similar feature amounts correspond to different states. For example, when, a red car comes and stops in front of a blue wall, pixels included in a region where the red car stops hold two states of blue and red feature amounts. Each state holds a state number, an image feature amount which represents that state, a time of creation, and an active flag. The state number is used to identify each state, and is generated in turn from 1. The time of creation is that at which the state was created in a background model for the first time, and is expressed by a time or frame number. In this embodiment, the time of creation is expressed by a frame count. The active flag indicates a state corresponding to the current frame image, and is set to be 1 at this time (0 in other cases). Then, a plurality of states at an identical position in a frame image are continuously stored at an address referred to by a pointer of the background model management information. In the example of FIG. 5, for a position of coordinates (0, 0), a state of a state number=1 is stored at an address=1200, and that of a state number=2 is subsequently stored at an address=1201. Therefore, all states corresponding to a position of interest can be read out as follows. That is, pointers of the position of interest and the next position are referred to from the background model management information, and states from the address of the position of interest to an address immediately before the next position can be read out.

The above description is presented only for the exemplary purpose. For example, one position-dependent background model information may include a field for storing pointers to subsequent position-dependent background model information having a different state number, and if that field stores a non-existent value, that position-dependent background model information may be considered as last information.

Figure 4:
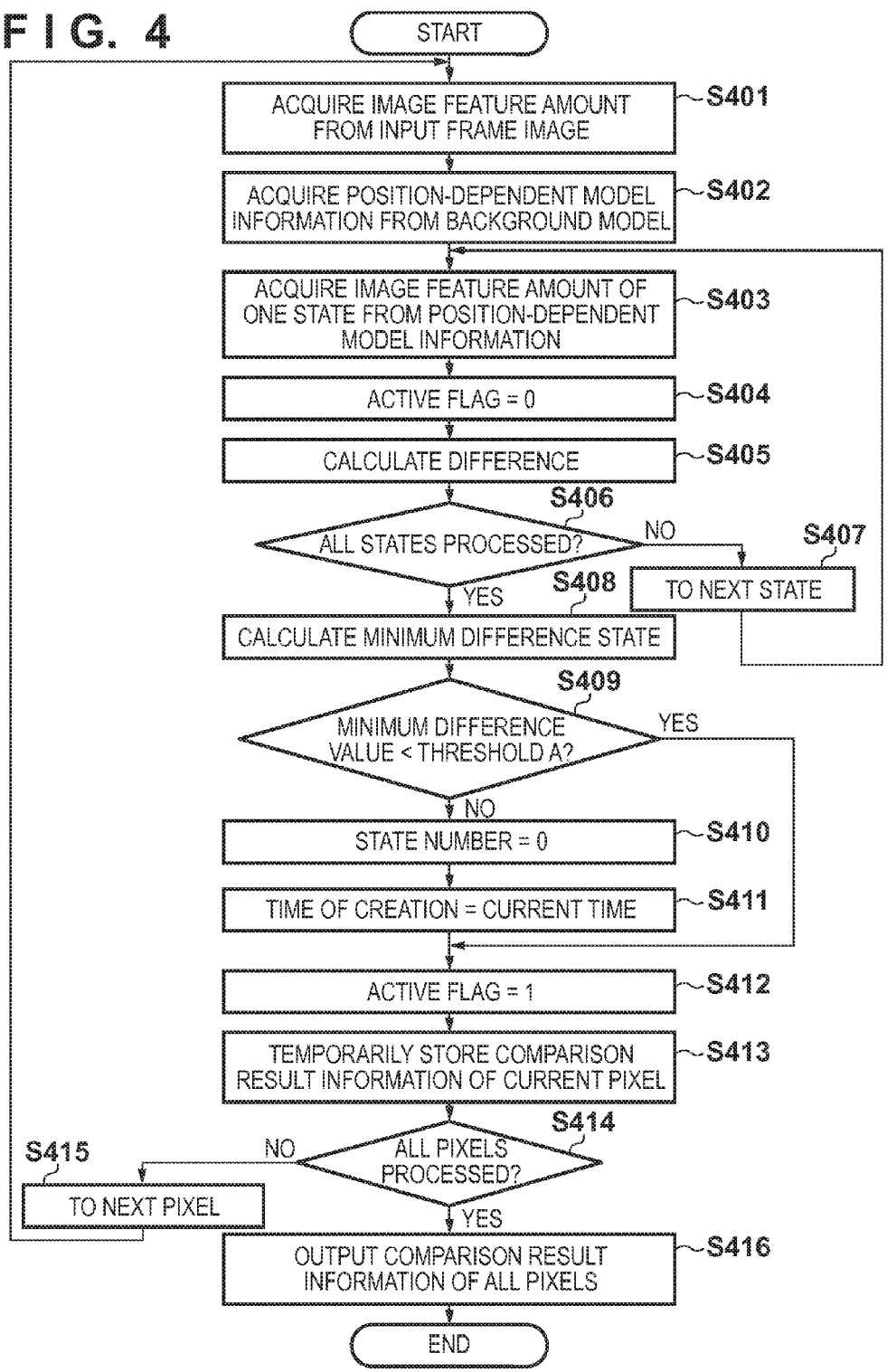
FIG. 4 is a flowchart showing the detailed processing sequence of comparison processing.

The description will revert to that of step S402 of FIG. 4. From the background model management information, a pointer to position-dependent background model information of the position of interest is referred to, and pieces of position-dependent background model information of all states of the position of interest are read out. In the example of FIG. 5, at the first position, pieces of position-dependent background model information of the following two states are read out. The first state is {state number=1, feature amount=100, time of creation=0, active flag=1} from an address=1200. The second state is {state number=2, feature amount=230, time of creation=101, active flag=0} from an address=1201.

Next, a feature amount of one state is read out from the pieces of position-dependent background model information of the position of interest read out in step S402 (step S403). Then, an active flag is set to be 0 (step S404). This is to initialize the previous result. Then, a difference from a feature amount at the same position in the input frame image is calculated (step S405). As a difference calculation method, an absolute value of a difference between the two feature amounts is used. However, the present invention is not particularly limited to this. For example, a square of the difference may be used. Then, the difference value is temporarily stored in the RAM 103 in association with the position in the input frame image and the state number used to calculate the difference. It is then determined whether or not states used to calculate a difference still remain at the position of interest (step S406). If such states still remain, the next state is read out from the position-dependent background model information (step S407). Then, the processes of steps S403 and S405 are repeated.

Next, a minimum value of the difference values between the feature amount of the input frame image and all the states is calculated in association with the position of interest (step S408).

Next, the minimum difference value at the position of interest is compared with a threshold A (step S409). If the difference value is smaller than the threshold, it can be judged that the state of the input frame image is similar to that stored in the background model. Conversely, if the difference value is larger than the threshold, it can be determined the state of the input frame image is different from all the states stored in the background model, and is a new state.

If a new state is determined in step S409, a special number (example: 0) which means a new state is set as a state number (step S410). A new state number is generated again when the background model update unit 205 updates the background model. Next, the current time is set as a time of creation at which this state is created for the first time (step S411). Note that in this embodiment, the current frame number is used. However, a normal time expression (for example, 00:00:00) may be used.

Next, an active flag is set to be 1 to indicate a state corresponding to the current frame (step S412).

Next, the state number, the feature amount of the input image, and the time of creation are temporarily stored in the RAM 103 as comparison result information in association with the coordinates in the input frame image (step S413).

It is then determined whether or not the processes are complete for all pixels (coordinates) in the frame image (step S414). If pixels to be processed still remain, the process advances to the next pixel in a raster scan order (step S415), thus repeating the processes of steps S401 to S413.

If the processes of steps S401 to S413 are complete for all the pixels, comparison result information (exemplified in FIG. 7) for all the pixels is output to the background model update unit 205 and foreground/background determination unit 206 (step S416).

In this manner, a state in the background model closest to an input video can be calculated for each pixel.

Note that no background model is stored at the beginning of use of this object detection apparatus. Hence, maximum values that can be assumed as difference values or the like are set as difference calculation values. All these values are determined as new states in step S409, and are stored in a background model in background model update processing (to be described later). In this manner, a background model can be initialized by an input frame image at an activation timing.

The details of the comparison processing in step S302 have been described.

Figure 6:
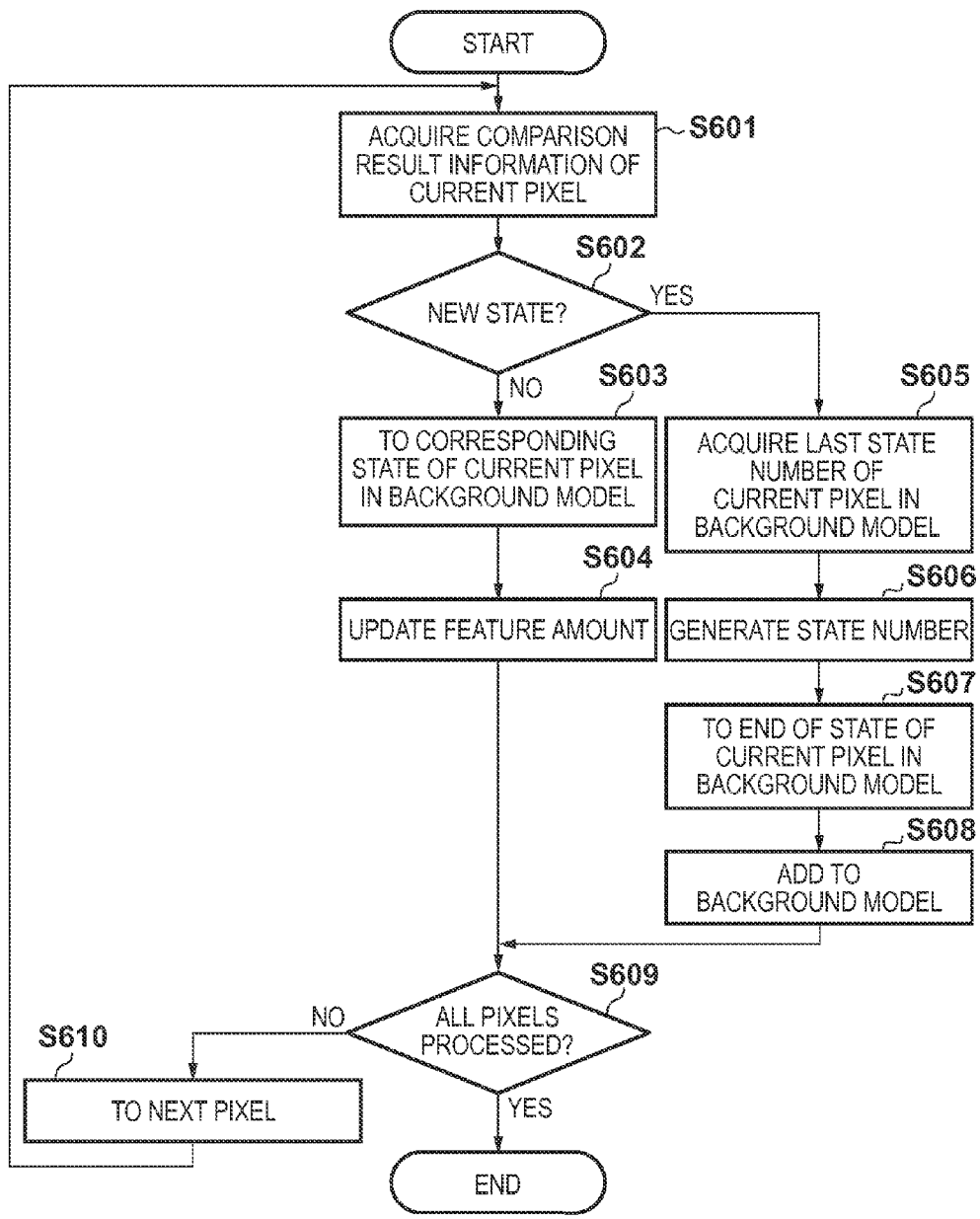
FIG. 6 is a flowchart showing the detailed processing sequence of background model update processing.

Details of the background model update processing (background model update unit 205) in step S303 will be described below with reference to the flowchart shown in FIG. 6.

Comparison result information for one pixel is acquired in turn with reference to coordinates to have an upper left pixel of the frame image as a start point from the comparison result information (FIG. 7) as the outputs of the comparison unit 203 (step S601).

It is checked whether or not a state of the current pixel is a new state (step S602). This checking step can be attained with reference to the state number in the comparison result information. That is, if the state number is 0, the state of the current pixel is a new state; otherwise, the state of the current pixel is an existing state included in the background model.

If the state of the current pixel is an existing state, corresponding position-dependent background model information in the background model (FIG. 5) is updated. A pointer to a state of the matched coordinates is acquired with reference to background model management information in the background model from the coordinates of the current pixel. The pointer is advanced in turn while reading out information, and position-dependent background model information which matches the state number read out from the comparison result information (FIG. 7) is referred to (step S603).

Then, the feature amount in the background model is updated by the input feature amount in the comparison result information (FIG. 7) (step S604).

This is to cope with a change caused by a change in illumination or the like. For example, the update method follows:

$$\mu_t = (1-\alpha) \cdot \mu_{t-1} + \alpha \cdot I_t \tag{1}$$

where t indicates the current frame, and t−1 indicates the immediately preceding frame. $\mu_{t-1}$ is a feature amount value before update, and $\mu_t$ is a feature amount value after update. $I_t$ is a feature amount value of the input frame. $\alpha$ is a weight having a value ranging from 0 to 1, and the updated value becomes closer to the input value as the weight assumes a larger value.

On the other than, if a new state is determined in step S602, that state is added to the background model.

A pointer to a state of the matched coordinates is acquired with reference to background model management information in the background model from the coordinates of the current pixel. Then, the pointer is advanced to that of a state of coordinates of the next pixel to acquire a last state number of a state of the current coordinates (step S605).

A state number of the new state is generated (step S606). More specifically, a value next to the last state number is used. Note that when a state is added to the background model for the first time as in an activation timing of this object detection apparatus, a state number=1 is assigned.

Since the new state is added next to the last state of the current pixel, a pointer to a state of the matched coordinates is acquired with reference to background model management information in the background model from the coordinates of the next pixel (step S607). As the new state, an input feature amount of the current coordinates in the input state information and a time of creation are inserted here together with the generated state number (step S608).

It is then determined whether or not the processes of steps S601 to S608 are complete for all pixels (coordinates) in the frame image (step S609). If pixels to be processed still remain, the process advances to the next pixel in a raster scan order (step S610), thus repeating the processes of steps S601 to S608. If the processes are complete for all the pixels, this processing ends.

The details of the background model update processing in step S303 have been described.

Figure 8:
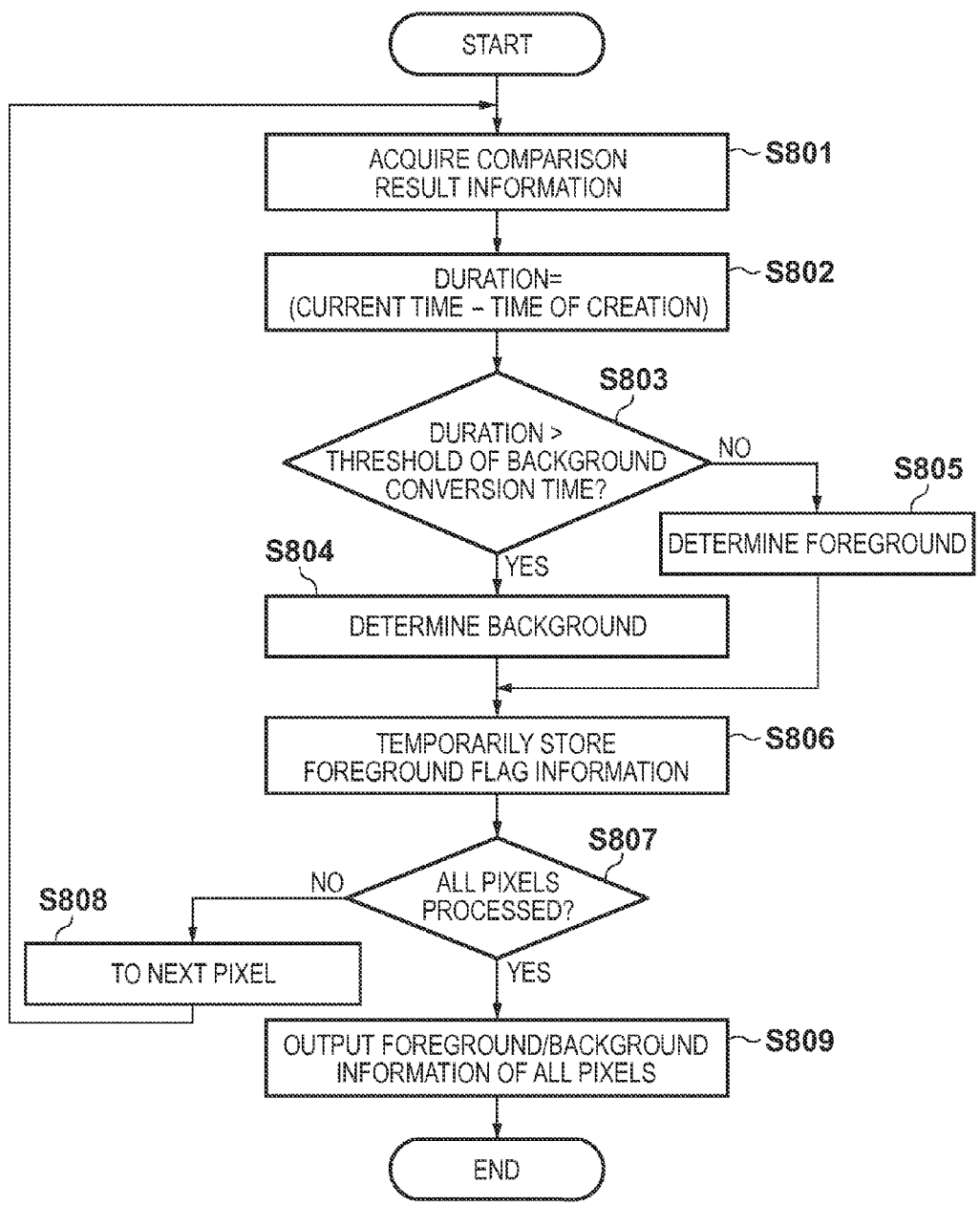
FIG. 8 is a flowchart showing the detailed processing sequence of foreground/background determination processing.

The details of the foreground/background determination processing (foreground/background determination unit 206) in step S304 will be described below with reference to FIG. 8.

Comparison result information is referred to and acquired one by one in a raster scan order to have an upper left pixel of the frame image as a start point from the comparison result information (FIG. 7) as the outputs of the comparison processing in step S302 (step S801).

Duration (current time–time of creation) from the appearance time of a certain state (feature) in the video until the current time is calculated based on the time of creation of the comparison result information (FIG. 7) (step S802), and is compared with a threshold of a background conversion time (step S803). The threshold of the background conversion time means that an object detected as a foreground object is handled as a background object (to be converted into a background object) to have that value as a border. If the duration is not less than the threshold of the background conversion time, a foreground flag is set to be "0" which means "background" (step S804). On the other hand, if the duration is less than the threshold of the background conversion time, a foreground is determined, and a foreground flag is set to be "1" (step S805). Assume that the threshold of the background conversion time is normally a fixed value B. For example, if the fixed value B=5 min (9000 frames for 30 frames/sec), an object can be detected as a foreground object for 5 min.

Next, the foreground flag is temporarily stored as foreground/background information (exemplified in FIG. 9) in association with the coordinates of the current pixel in the frame image and the duration time (step S806).

It is then determined if the processes are complete for all pixels (coordinates) in the frame image (step S807). If pixels to be processed still remain, the process advances to the next pixel (step S808), thus repeating the processes of steps S801 to S806. If the processes of steps S801 to S806 are complete for all the pixels, foreground/background information (FIG. 9) for all the pixels is output to the object region output unit 207 (step S809).

Figure 10:
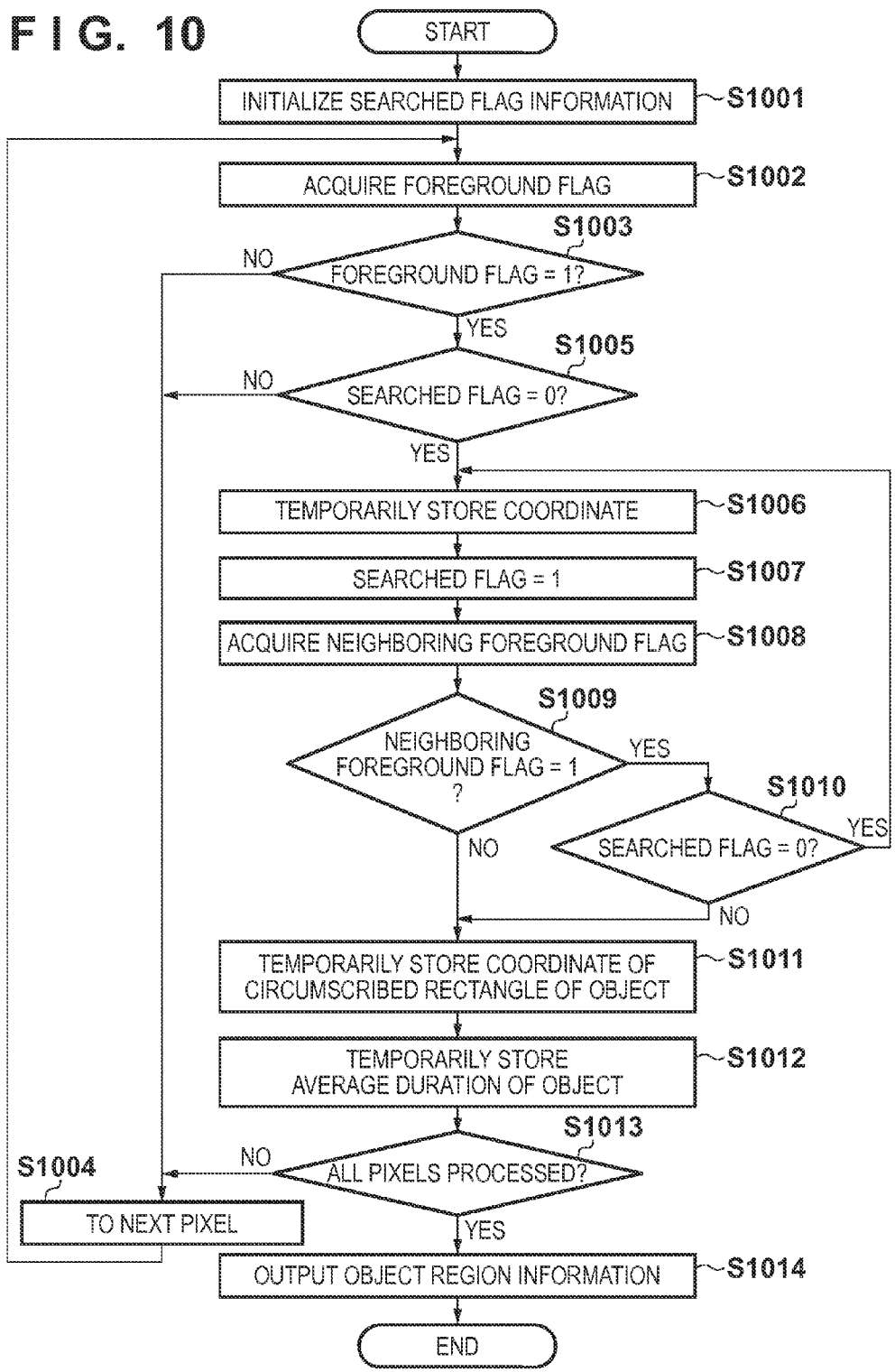
FIG. 10 is a flowchart showing the detailed processing sequence of object region output processing.

Next, details of the object region output processing (object region output unit 207) in step S305 of FIG. 3 will be described below with reference to FIG. 10.

In order to combine as an object region, a searched flag indicating whether or not a pixel of the foreground flag=1 has been searched is prepared. This searched flag is associated with respective coordinates in the frame image. Since the searched flag=1 is interpreted as "searched", search flags corresponding to all coordinates are initialized to 0 (step S1001).

Assume that a foreground flag is acquired with reference to coordinates of the foreground/background information stored in the RAM 103 (FIG. 9) to have an upper left pixel of the frame image as a start point (step S1002).

Next, it is checked if the foreground flag of the current coordinates is 1 (step S1003). If the foreground flag is 0, since it indicates a background, the process advances from the current pixel to the next pixel in a raster scan order (step S1004).

On the other hand, if it is determined in step S1003 that the foreground flag=1, since that pixel belongs to a foreground, it is checked whether or not a searched flag of the current coordinates is 0, that is, whether or not this pixel has not been searched yet (step S1005). If the searched flag is 1, since this pixel has already been searched, the process advances from the current pixel to the next pixel in a raster scan order (step S1004).

If the searched flag=0 in step S1005, since that pixel has not been searched yet, the current coordinates are temporarily stored (step S1006). Then, since the pixel has already been searched, the searched flag is set to be 1 (step S1007). Next, a neighboring foreground flag is acquired so as to search for a continuous foreground pixel (step S1008). It is then checked if the neighboring foreground flag is 1 (step S1009). If the foreground flag is 1, since that pixel is a continuous pixel, it is determined whether or not its searched flag is 0 (step S1010). If the searched flag is 0, since that pixel has not been searched yet, the control return to step S1006 to further search for neighboring pixels.

The processes of steps S1002 to S1010 are repeated until it is determined in step S1010 that all neighboring pixels have been searched (searched flag=1) or it is determined in step S1009 that all neighboring pixels are background pixels (foreground flag=0).

If pixels of a continuous foreground (object) are found by the processes of steps S1002 to S1010, a circumscribed rectangle is calculated from the coordinates of these pixels, which are temporarily stored, and upper left coordinates and lower right coordinates of that circumscribed rectangle are temporarily stored in the RAM 103 (step S1011).

Next, durations corresponding to these pixels (coordinates) are acquired from the comparison result information, and an average value of the acquired durations is calculated and temporarily stored in the RAM 103 (step S1012).

It is determined whether or not the processes of steps S1002 to S1012 are complete for all pixels in the frame image (step S1013). If pixels to be processed still remain, the process advances from the current pixel to the next pixel in a raster scan order (step S1004).

If the processes of steps S1002 to S1012 are complete for all pixels, the upper left coordinates and lower right coordinates of object regions and their average appearance times, which are temporarily stored, are output as object region information (step S1014). FIG. 11 shows an example of the object region information, and the upper left coordinates and lower right coordinates and average appearance times of two object regions can be read out in from a start address.

The details of the object region output processing in step S305 have been described. Note that the output object region information is used in, for example, an abandoned object detection apparatus (not shown) which detects an abandoned object. The abandoned object detection apparatus generates an abandonment event when a predetermined time period continues with reference to the average durations of objects. Also, the apparatus generates a rectangle with reference to the upper left coordinates and lower right coordinates of the rectangle of the object region, and superimposes the rectangle on an input video, thus presenting the position of the abandoned object to the user.

Figure 12:
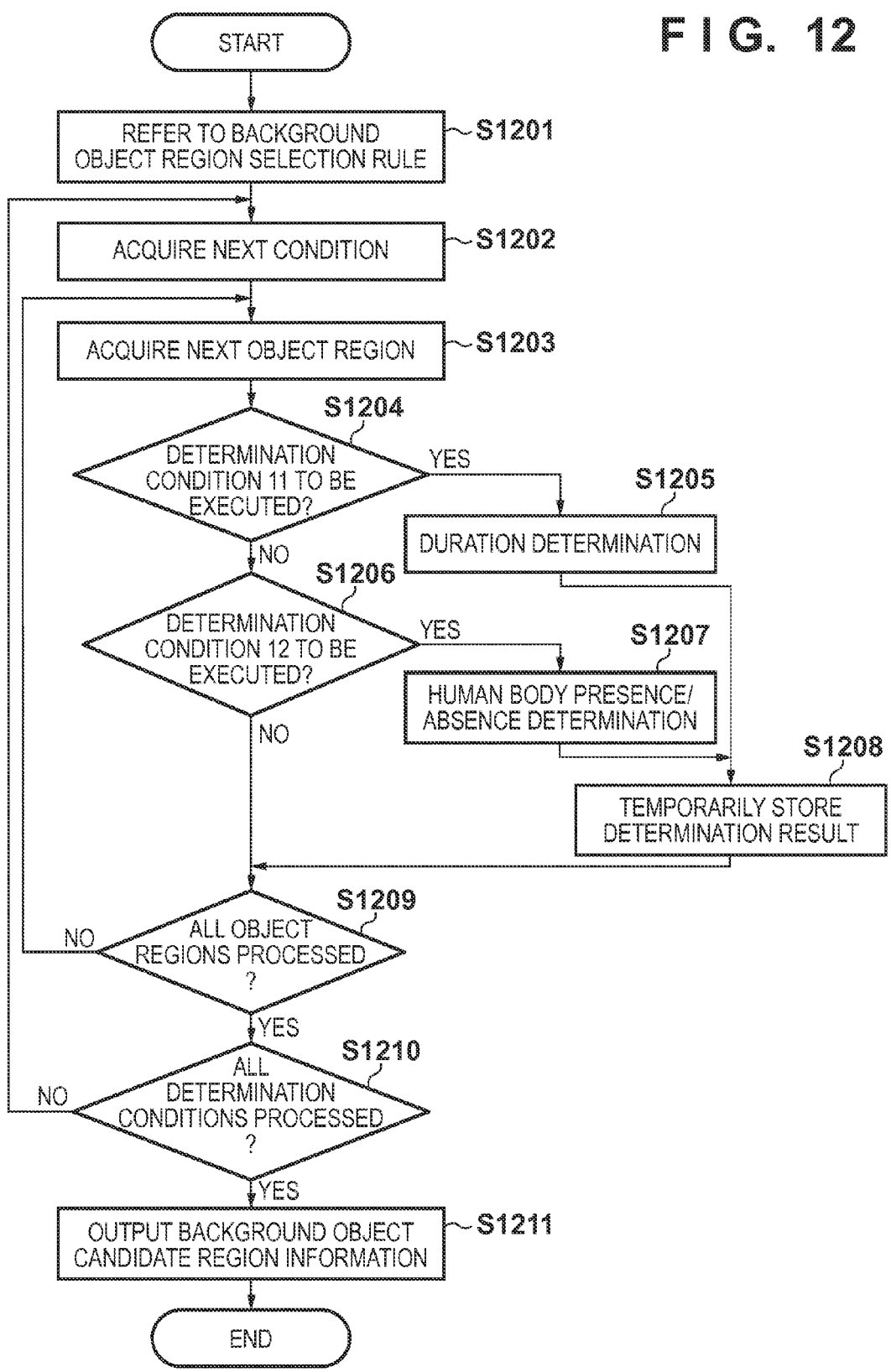
FIG. 12 is a flowchart showing the sequence of first background object region selection processing.

Details of the first background object region selection processing (first selection unit 208) in step S306 of FIG. 3 will be described below with reference to FIG. 12.

Figure 13:
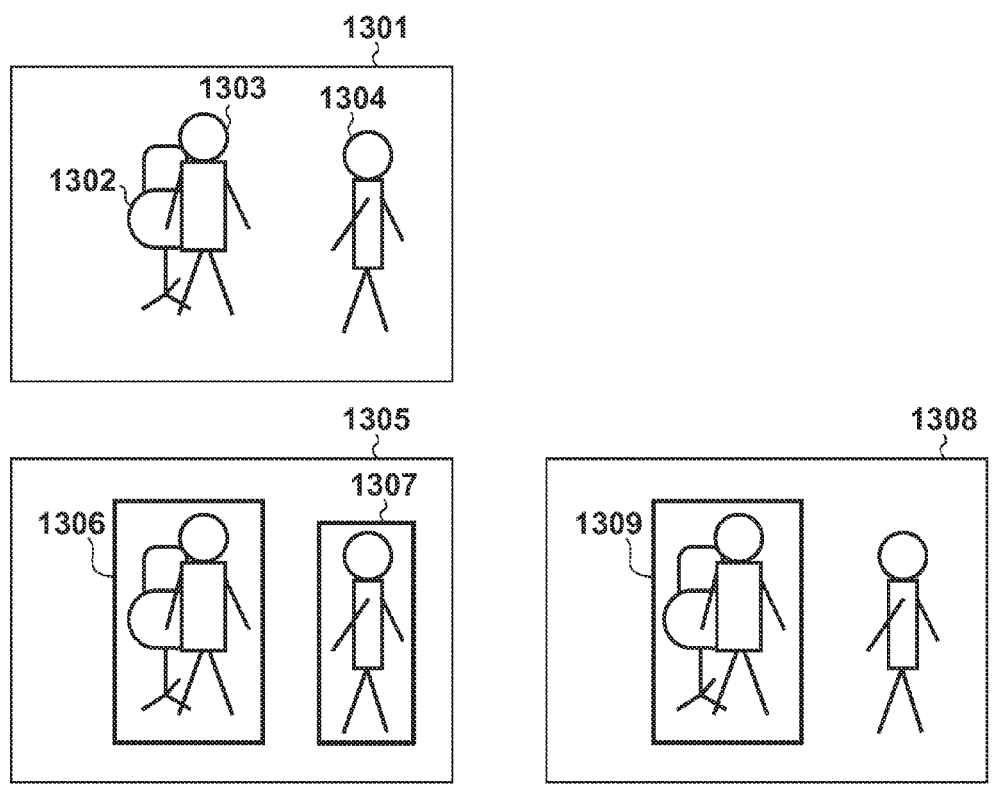
FIG. 13 is a view for explaining a processing result of the first background object region selection processing.

Object regions in the object region information (FIG. 11) are classified into object regions including background objects and those which do not include any background objects, and background object candidate regions are output. FIG. 13 is a view for explaining the processing result of this processing. In FIG. 13, reference numeral 1301 denotes a frame image, which includes a chair 1302, a person 1303 who stands in front of the chair 1302, and a person 1304 cuts across in the frame. In a frame 1305, object regions detected from background differences are superimposed, and regions 1306 and 1307 are detected as objects. Assume that the chair included in the region 1306 has a direction different from that when the background model is generated, and is detected as a part of the object. The first background object region selection processing selects an object region including a background object (the chair 1302 in this example), and outputs a region 1309 including the chair as a background object candidate region, as denoted by reference numeral 1308. This processing will be described in detail below.

Initially, a first scene-dependent background object region selection rule corresponding to a scene ID designated by the user is referred to from the rule storage unit 211 (step S1201). Although an arrangement related to designation from the user is not particularly shown in FIG. 2, it includes the input device 106 and the display device 107 confirmed by the user, and the user designates a scene ID by selecting it from a scene ID list displayed on the screen. Note that the scene ID is defined according to an installation environment of the object detection apparatus and the like. For example, a scene ID=1 indicates a waiting room, and a scene ID=2 indicates an automatic door. The user selects these scene IDs in correspondence with the installation environment, thus obtaining an optimal object detection result.

The first scene-dependent background object region selection rules loaded in the first background object region selection processing will be described in detail below with reference to FIG. 14.

Each rule of the first scene-dependent background object region selection rules includes a scene ID, determination conditions (the number of determination conditions, a determination condition start pointer), parameters (the number of parameters, a parameter start pointer), and an adoption condition. Note that the scene ID is as described above.

The determination conditions are required to select a background object region, and include, for example, a condition for determining whether or not the (average) duration of an object region is not less than a predetermined value (condition 11), a condition for determining whether or not an object region includes a human body region (condition 12), and the like. The determination conditions as many as the number described as the number of determination conditions are defined, and can be read out and acquired in turn from an address pointed by the determination condition start pointer.

The parameters include parameter values such as a threshold used in the determination condition. The parameters as many as the number described as the number of parameters are defined, and can be read out and acquired in turn from an address pointed by the parameter start pointer.

The adoption condition indicates that of a background object candidate region depending on the determination conditions to be satisfied. For example, the adoption condition includes adoption of only an object region which satisfies the determination conditions (ONLY), that of all object regions if at least one object region satisfies the determination conditions (ALL), and the like.

Next, one of the determination conditions acquired from the loaded first background object selection rule is acquired (step S1202).

It is determined in subsequent steps S1203 to S1209 whether or not the determination condition is satisfied for all object regions.

One object region is acquired from the object region information (FIG. 11) (step S1203). It is respectively checked in steps S1204 and S1206 whether or not predetermined determination conditions (11, 12) are designated. If determination condition 11 is designated (YES in step S1204), duration determination processing is executed in this example (step S1205) (details will be described later). If determination condition 12 is designated (YES in step S1206), human body presence/absence determination processing is executed in this example (step S1207) (details will be described later). A determination result is temporarily stored in the RAM 103 in association with the coordinates of the current object region as 1 when the determination condition is satisfied or as 0 in another case (step S1208).

It is determined in step S1209 whether or not the processing is complete for all object regions. If object regions to be processed still remain, the process returns to step S1203 to select the next object region. If it is determined that the processing is complete for all object regions (YES in step S1209), it is determined whether or not determination is complete for all determination conditions specified in the rule (step S1210). If determination is not complete yet, the process returns to step S1202 to select the next determination condition; otherwise, the process advances to step S1211.

Background object candidate regions are adopted according to the adoption rule specified in the rule, and the adopted object region information is output as background object candidate region information (step S1211). FIG. 15 shows an example. A background object ID is generated in turn from "1" for an object region selected as a background object. Upper left coordinates and lower right coordinates of an object region are the same as those in the object region information (FIG. 11).

The series of processes described above will be described in more detail below using examples of a waiting room scene and automatic door scene.

a. Waiting Room Scene:

In a waiting room, a typical background object is a chair. Such object is frequently moved or rotated by a person. A detection error has occurred each time, but since the chair is not a moving object, it is kept erroneously detected at the same position as if a new still object were appearing. That is, an object region with long duration is likely to be a background object. Using this, a region (including) of a background object is selected. Hence, "11" is designated as a determination condition of the background object region selection rule. YES is determined in step S1204, and the duration determination unit 213 executes duration determination processing (step S1205). Assume that an object region having sufficiently long (average) duration satisfies the condition as a result of comparison with a threshold. A value of the threshold is described in the rule as a parameter value, as exemplified in FIG. 14. After the determination condition is verified in this way, since the adoption rule of this scene is "ONLY", only an object region which satisfies determination condition 11 is selected as a background candidate region in step S1211.

b. Automatic Door Scene:

In a scene of coming and going of a person at an automatic door, a door frame, which moves upon opening of the automatic door, is an object which originally exists in a true background. However, since a difference is generated from the background model when the door frame is moved, the door frame is erroneously detected as an object. This background object (automatic door frame) may be moved or may be at a stop. Therefore, the automatic door scene cannot be determined using determination condition 11 (duration) of the waiting room scene. The automatic door is opened/closed when a person appears. Thus, when even one object region including a person is detected, all object regions detected at that time can be background object candidates. Using this, a region (including) of a background object is selected from the object regions. "12" is designated as the determination condition of the background object region selection rule. YES is determined in step S1206, and the human body presence/absence determination processing is executed using the human body detection unit 212 (step S1207). Assume that if a human body is detected within an object region, that object region satisfies the condition. After the determination condition is verified in this manner, if at least one object region satisfies determination condition 12, all object regions in the object region information (FIG. 11) are selected as candidate regions in step S1211.

Details of the human body detection unit 212 will be described below. For example, U.S. Patent Application Publication No. 2007/0237387 is known. With this technique, a detection window having a predetermined size is scanned on an input image to execute 2-class classification for each pattern image obtained by clipping an image in the detection window as to whether or not an object (human body) is detected. In this classification, a classifier is configured by effectively combining many weak classifiers using Ada-Boost, thereby improving the classification precision. Also, the classifiers are connected in series to configure a cascade type detector. Each weak classifier is configured by a HOG (Histogram of Oriented Gradients) feature amount. Then, the cascade type detector immediately removes a candidate of a pattern which is apparently not an object using simple classifiers in the former stage. Then, whether or not each of only the remaining candidates is an object is classified using complicated classifiers in the latter stage having higher identification performance.

Figure 16:
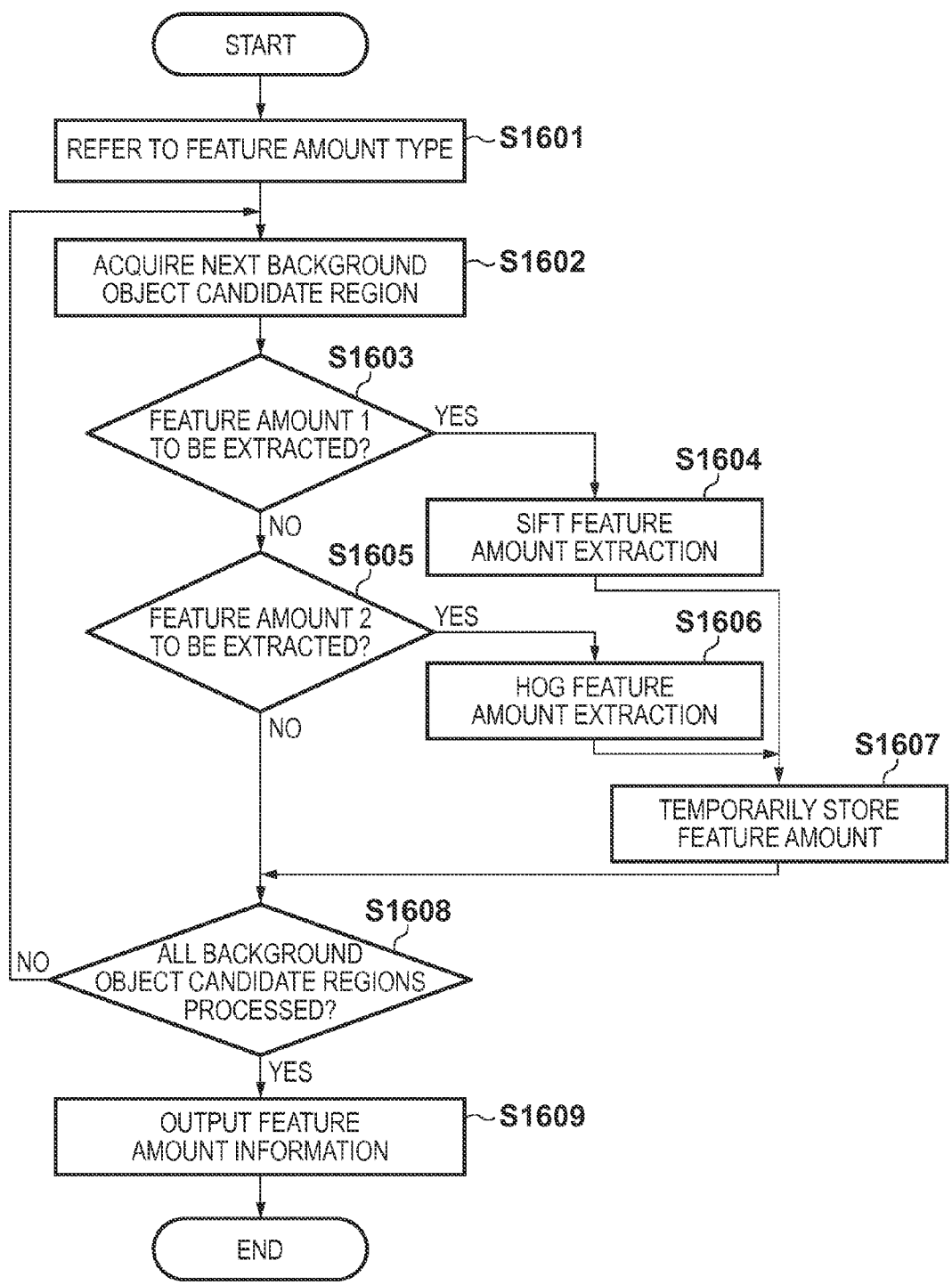
FIG. 16 is a flowchart showing the sequence of second feature amount extraction processing.

Next, details of the second feature amount extraction processing (second feature amount extraction unit 209) in step S307 will be described below with reference to FIG. 16. This processing extracts feature amounts of a type suited to a scene from the background object candidate regions selected by the aforementioned first background object region selection processing.

Initially, a feature amount type according to the currently designated scene is acquired from scene-dependent feature amount type information exemplified in FIG. 17 (step S1601).

Next, one background object candidate region (coordinates thereof) is acquired from the background object candidate region information (FIG. 15) (step S1602). Feature amounts are extracted from the background object candidate region of the current frame image. It is respectively checked in steps S1603 and S1605 whether or not predetermined feature amount types (feature amount 1, feature amount 2) are designated. If feature amount 1 is designated (YES in step S1603), SIFT feature amount extraction processing is executed in this example (step S1604). Details of SIFT feature amounts will be described later. If feature amount 2 is designated (YES in step S1605), HOG feature amount extraction processing is executed in this example (step S1606). Details of HOG feature amounts will be described later. Extracted feature amounts are temporarily stored as feature amount information in the RAM 103 in association with a background object ID (step S1607). FIG. 18 shows an example. The number of feature amounts is that of feature amounts extracted from a region of the background object ID. A feature amount pointer is a storage destination address of feature amounts. Feature amounts as many as the number of feature amounts can be read out in turn from an address pointed by the feature amount pointer. Feature amounts are stored in the order of coordinates and feature amounts together with the coordinates at which feature amounts are extracted.

It is determined in step S1608 whether or not the processing is complete for all background object candidate regions. If candidate regions to be processed still remain, the process returns to step S1602 to select the next background object candidate region.

If feature amounts are extracted for all background object candidate regions (YES in step S1608), extracted feature amount information is output (step S1609).

The series of processes described above will be described in more detail below using examples of a waiting room scene and automatic door scene.

a. Waiting Room Scene:

In a waiting room, since a typical background object is a chair, feature amounts which express a shape well are desirably used. Since the chair is likely to be placed at every positions in the frame, feature amounts invariable against enlargement/reduction and in-plane rotation are desirably used. Arbitrary feature amounts can be used as long as they satisfy such conditions. In this embodiment, Scale Invariant Feature Transformation (SIFT) feature amounts are used. YES is determined in step S1603, and SIFT feature amount extraction processing is executed (step S1604).

For further details of SIFT feature amounts, please refer to literature [D. G. Lowe, "Object recognition from local scale—invariant features", Proc. of IEEE International Conference on Computer Vision (ICCV), pp. 1150-1157, 1999.]. The SIFT feature amounts will be briefly described below. A plurality of images, which are smoothed by a Gaussian function and have different scales, are generated, and an extremal value is detected from their difference image. From a point as this extremal value (to be referred to as a key point hereinafter), a feature is extracted. A dominant gradient direction in the key point is decided, and a Gaussian window used to extract feature amounts is set with reference to that direction to fit the scale of the difference image from which the key point is extracted. Therefore, the extracted feature amounts are invariable against in-plane rotation and scale. Therefore, using the feature amounts, even when a distance change from a camera upon movement of a background object or a change in direction (in-plane rotation) of the object have occurred, the object can be expressed using identical feature amounts. Since new feature amounts need not be registered in the background object feature information every time such change has occurred, the SIFT feature amounts are suited to the waiting room scene. The feature amount is divided into 4×4 blocks, and histograms in eight directions are calculated from respective blocks. Therefore, 128-dimensional feature amounts are obtained.

b. Automatic Door Scene:

In a scene of coming and going of a person at an automatic door, since a shape of a door frame, which appears when the automatic door is opened, is a rectangle, and the number of points used as key points is small, SIFT feature amounts cannot be sufficiently extracted. Since movement occurs in only a specific region in the frame, a size is fixed. Therefore, feature amounts which are invariable against enlargement/reduction and in-plane rotation need not be used. Hence, feature amounts more suited to this scene are required. As feature amounts which express an automatic door shape well, this embodiment uses HOG feature amounts. Of course, the present invention is not limited to such specific feature amounts. For example, contour lines may be extracted, and may be used as feature amounts. YES is determined in step S1605, and the HOG feature amount extraction processing is executed (step S1606).

For further details of HOG feature amounts, please refer to literature [N. Dalal and B. Triggs, "Histogram of Gradients for Human Detection", Computer Vision and Pattern Recognition, Vol. 1, pp. 886-893, 2005.]. HOG feature amount will be briefly described below. A gradient image is calculated from an input image, and is divided into blocks each including 2×2 cells each including 8×8 pixels. Edge strength histograms of nine directions are calculated in respective cells. Therefore, a 36-dimensional feature amount is extracted per block. Since attention is focused on edge strengths for respective edge directions, the feature amounts are suited to expression of the shape of the door frame and the like.

Figure 19:
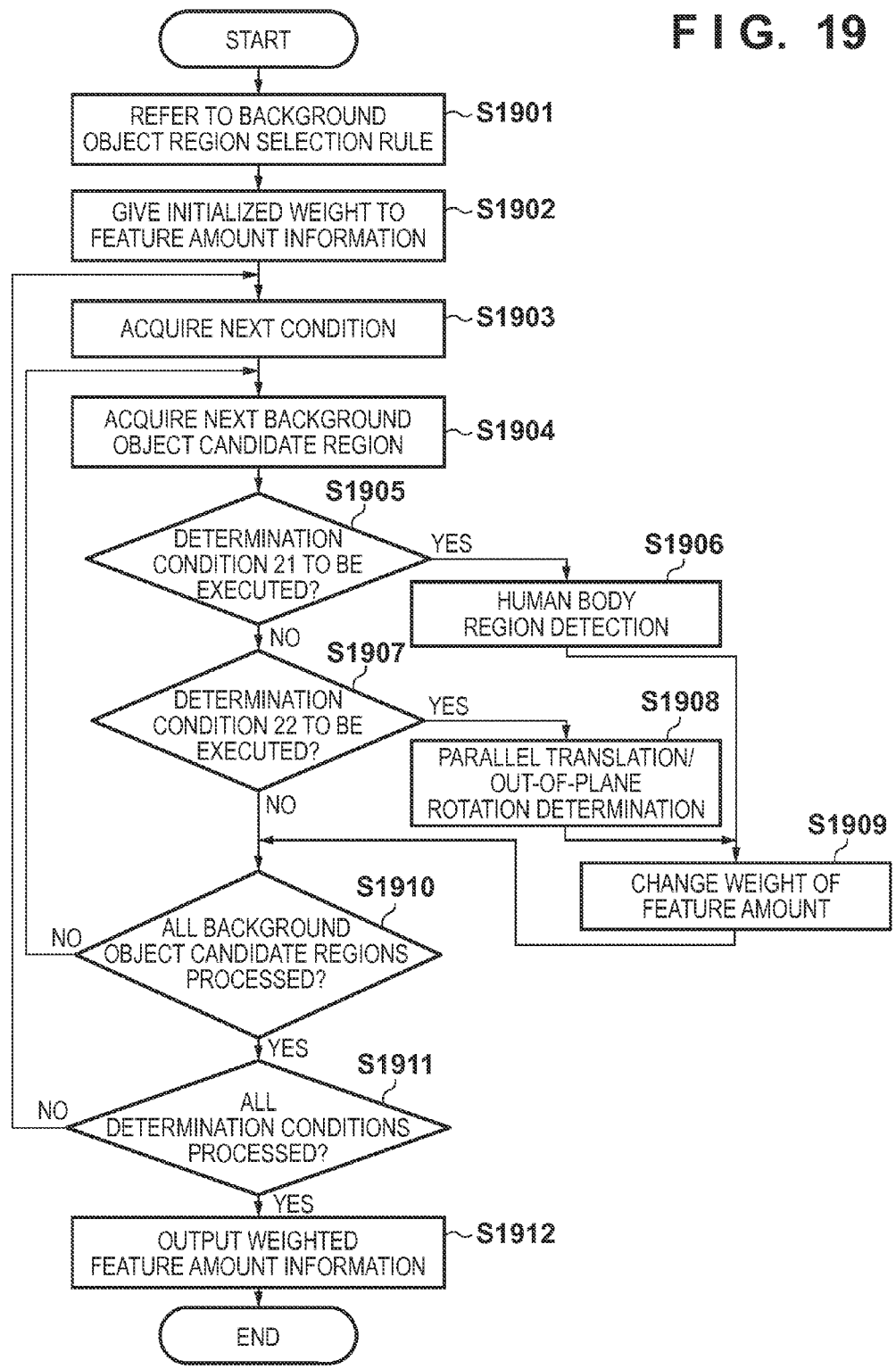
FIG. 19 is a flowchart showing the sequence of first background object region selection processing.

Details of the second background object region selection processing (second background object region selection unit 210) in step S308 will be described below with reference to FIG. 19. This processing further narrows down the background object candidate regions selected by the first background object region selection processing to partial regions of background objects.

Figures 20, 21:
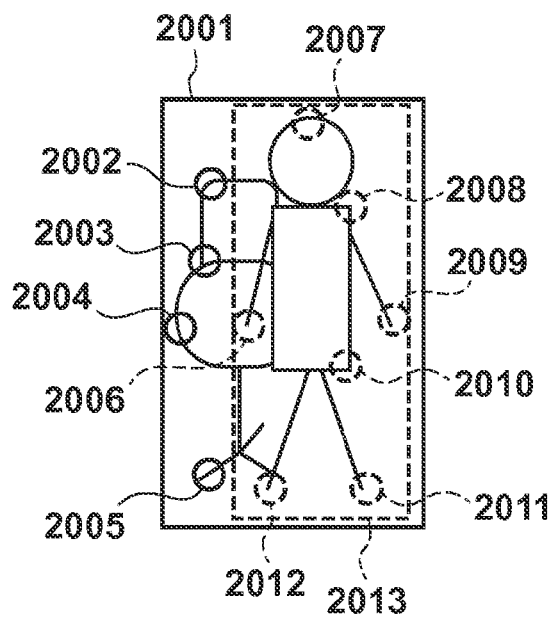
FIG. 20 is a view for explaining a processing result of second background object region selection processing.
FIG. 21 is a table showing an example of second scene-dependent background object region selection rules.

FIG. 20 is a view for explaining a processing result of this processing. Reference numeral 2001 denotes a background object candidate region corresponding to the region 1309 in FIG. 13. Reference numerals 2002 to 2012 denote points from which feature amounts are extracted by the second feature amount extraction processing. Of these points, the points 2002 to 2005 are extracted from the chair, and the points 2006 to 2012 are extracted from the person. An object such as the person of this example, a dog, or an automobile is an object which autonomously moves (to be referred to as a moving object), comes into and goes away from a video, and is not a background object. Therefore, a unit, which detects a moving object region, removes a moving object region from background object candidate regions. In this example, the human body detection unit 212 calculates a human body region 2013, thus classifying feature amounts into those of the chair as a true background object and those in the human body region. More specifically, weights are given to respective feature amounts, so that weights for the feature amounts (2002 to 2005) of the background object are larger than those for the feature amounts (2006 to 2012) of the person. That is, a weight for each feature amount assumes a larger value as that feature amount is included in the background object with a higher possibility. The second background object region selection processing outputs feature amounts with weights decided in this way. This processing will be described in detail below.

From the rule storage unit 211, a second scene-dependent background object region selection rule corresponding to a scene ID designated by the user is referred to (step S1901).

The second scene-dependent background object region selection rules to be referred to by the second background object region selection processing will be described in detail below with reference to FIG. 21.

Each rule of the second scene-dependent background object region selection rules includes a scene ID, determination conditions (the number of determination conditions, a determination condition start pointer), and parameters (the number of parameters, a parameter start pointer). The scene ID is as described above.

Each determination condition is used to separate each background object region selected by the first background object region selection processing into a background object and other objects. For example, the determination conditions include a condition for determining whether or not a human body is included, and which region includes the human body if the human body is included (condition 21), a condition for determining whether parallel translation or out-of-plane rotation of an object is made (condition 22), and the like. The determination conditions as many as the number described in the number of determination conditions are included, and can be read out and acquired in turn from an address pointed by the determination condition start pointer.

Next, weights for feature amounts used upon generation of background object feature information are given to all feature amounts of the feature amount information (FIG. 18) to obtain weighted feature amount information (exemplified in FIG. 22) (step S1902). A weight assumes a value ranging from 0 to 1, and indicates a higher degree of a feature amount included in a background object as it is closer to 1. In this step, 1 is given as an initial value.

One of the determination conditions acquired from the second scene-dependent background object region selection rule (FIG. 21) is acquired (step S1903).

Figures 22, 23:
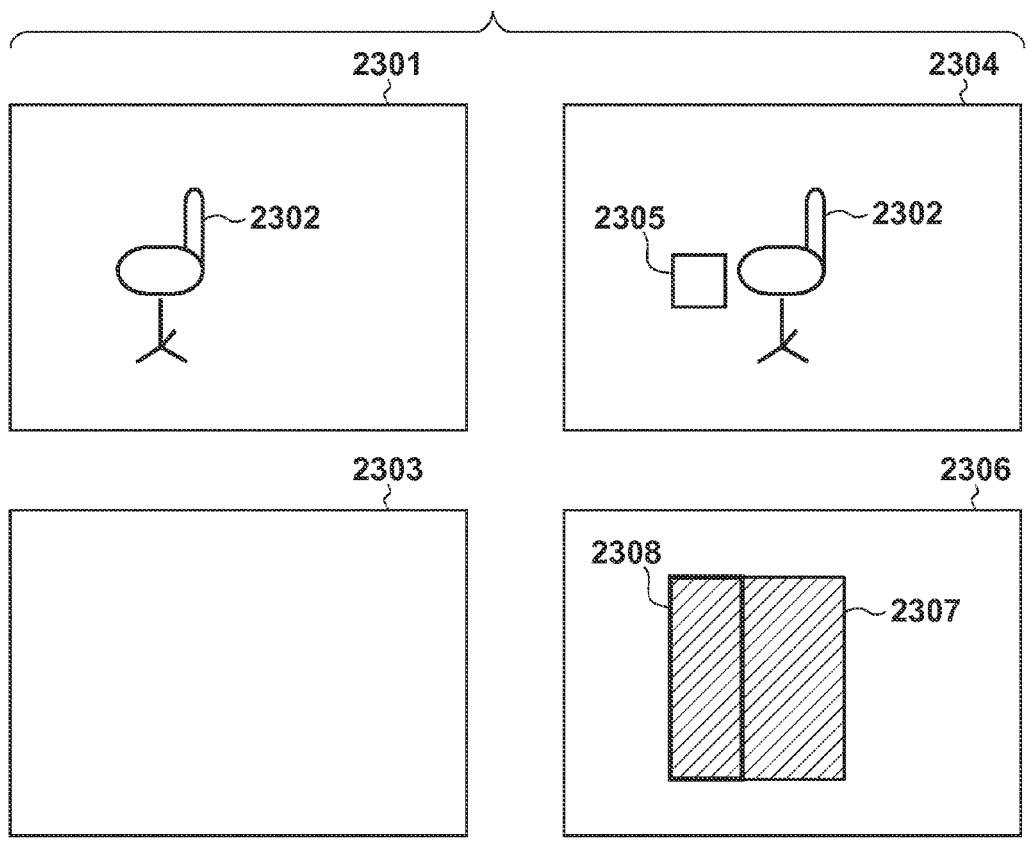
FIG. 22 is a table showing an example of weighted feature amount information.
FIG. 23 is a view for explaining an object detection result when an object is parallelly translated.

It is respectively checked in step S1904 and S1907 whether or not predetermined determination conditions 21 and 22 are designated. If determination condition 21 is designated (YES in step S1905), human body region detection processing is executed in this example (step S1906). If determination condition 22 is designated (YES in step S1907), parallel translation/out-of-plane rotation determination processing is executed in this example (step S1908) (details will be described later). As a result of determination, weights for feature amounts included in a region which is selected not to be included in a background object are reduced. From a background object ID to be processed, corresponding feature amounts are referred to based on coordinates of a selected region from the weighted feature amount information (FIG. 22). Weights of the feature amounts are reduced (by, for example, subtracting a fixed amount) (step S1909).

It is determined in step S1910 whether or not the processing is complete for all background object candidate regions. If background object candidate regions to be processed still remain, the process returns to step S1904 to select the next background object candidate region.

If it is determined that the processing for determining whether or not the determination condition specified in the rule is satisfied is complete for all background object candidate regions (YES in step S1910), it is determined whether or not determination is complete for all determination conditions specified in the rule (step S1911). If the determination is not complete yet, the control returns to step S1903 to select the next determination condition; otherwise, the process advances to step S1912. Then, weighted feature amount information (FIG. 22) having weights decided based on the determination conditions as attributes is output (step S1912).

The series of processes described above will be described in more detail below using examples of a waiting room scene and automatic door scene.

a. Waiting Room Scene:

The first background object region selection unit selects object regions having longer durations as background object candidate regions. Since a person often stands still for a while in a waiting room, a person region may be included in such background object candidate regions (FIG. 20 shows that example). Thus, "21" is designated as the determination condition of the background object region selection rule. YES is determined in step S1905, and the human body detection unit 212 executes human body detection processing for a background object candidate region as the current processing target (step S1906). Then, when a human body region is detected, weights of feature amounts in the human body region are reduced (by, for example, subtracting a fixed amount) in step S1909. If a reliability of the detection result of the human body detection unit can be output, weights may be decided in inverse proportion to this reliability.

On the other hand, the chair as a typical background object in the waiting room is often parallelly translated or rotated by a person. When the chair is (out-of-plane) rotated at an identical position, new features of the chair appear. However, since the new features are those of the background object itself, as a matter of course, they are required to be registered as background object feature information. However, when the chair is parallelly translated, since a region of a part of a background (to be referred to as a partial background hereinafter) hidden behind the chair generates a difference from the background model, it is unwantedly included in a background object candidate region. FIG. 23 shows an example. In FIG. 23, reference numeral 2301 denotes a frame image input at an activation timing of this object detection apparatus, and a background model is generated while including a chair 2302. Reference numeral 2303 denotes a detection result, and nothing is obviously detected at this timing. A state after an elapse of a certain time period since the chair 2302 is parallelly translated by a person corresponds to a frame image denoted by reference numeral 2304. The chair 2302 is parallelly translated to the right. Then, a wall pattern 2305 hidden behind the chair 2302 appears. Since the background model is generated in a state in which the chair 2302 is located at the position in the frame image 2301, a difference is also generated from a region which appears as a result of movement of the chair 2302 at a timing of the frame image 2304. Reference numeral 2306 denotes a background difference result. A hatched rectangular region 2307 indicates a region detected as an object. A rectangular region 2308 bounded by a bold black frame in the region 2307 is a partial background region which is not the chair as a background object. By extracting feature amounts from the object region 2307, feature amounts are also extracted from the partial background region 2308 since that region includes the pattern 2305.

Hence, "22" is designated in addition to "21" as the determination condition of the background object region selection rule. After the processing of determination condition 21, YES is determined in step S1907, and the movement determination unit 214 executes parallel translation/out-of-plane rotation determination processing for a background object candidate region as the current processing target (step S1908).

Figure 24:
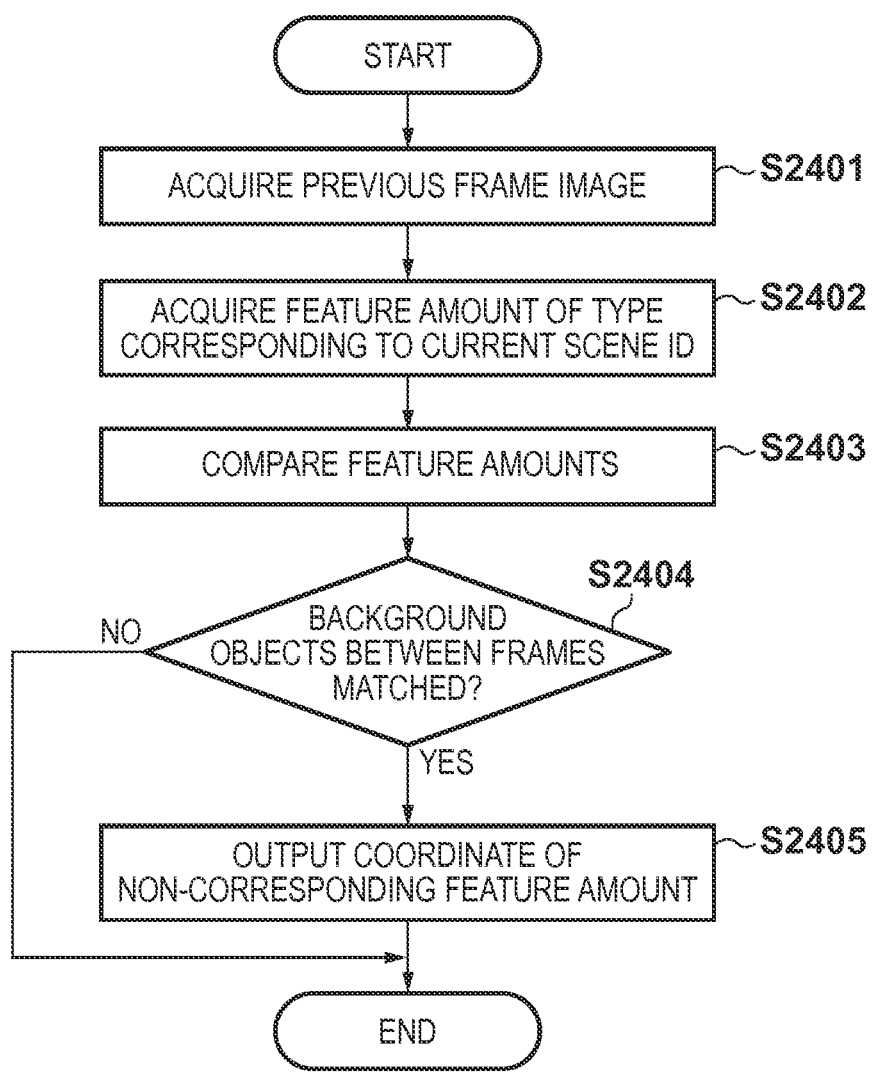
FIG. 24 is a flowchart showing the sequence of parallel translation/out-of-plane rotation determination processing.

Details of the parallel translation/out-of-plane rotation determination processing in step S1908 will be described below with reference to FIG. 24.

A previous frame image is acquired from the frame image storage unit 215 (step S2401). The previous frame image to be acquired can be that before the object (the chair 2302 in FIG. 23) is moved. For example, a method of selecting a frame image a sufficiently long fixed time period before may be used. If object region information is stored in association with a frame image, the following method can also be used. That is, with reference to the previous object region information, a frame image at a timing before the object began to be detected in the region of the current frame in which the object is detected can be found. Alternatively, an image may be reconstructed based on the background model. For example, if the background model is expressed by the DCT coefficients, inverse DCT transformation is executed to convert the background model into an image expressed by RGB values.

Next, feature amounts of a type corresponding to the current scene ID are acquired from the same region as the object region (the region 2307 in FIG. 23) as the current processing target in the acquired previous frame (step S2402). In this embodiment, SIFT feature amounts are acquired.

Next, the feature amounts acquired from the object regions of the previous frame image and the current frame image are compared (step S2403), and it is determined whether or not background objects (2302 in FIG. 23) included in the two object regions match (step S2404).

More specifically, for example, a method disclosed in literature [Yu Nakagawa, Tomokazu Takahashi, Yoshito Mekada, Ichiro Ide, and Hiroshi Murase, "Landmark symbol detection in real environment by multi-template generation," Proceedings of Dynamic Image Processing for Real Application workshop (DIA2008), pp. 259-264] is known. A correspondence relationship between points (coordinates from which feature amounts are extracted) of feature amounts in object regions in two frame images is decided based on Euclidean distances between feature amounts. If an adequate projection transform matrix can be calculated between points of a plurality of feature amounts including corresponding feature amounts in the object region in the current frame image and those of corresponding feature amounts in the object region in the previous frame image, it is determined that a similar positional relationship is maintained. Thus, it can be determined that background objects (2302 in FIG. 23) in the current frame and previous frame including corresponding feature amounts match.

If the two background objects match, it is considered that the background object (2302 in FIG. 23) was parallelly translated. At this time, non-corresponding feature amounts (extracted from the partial background region 2308 in FIG. 23) are output (step S2405). If the two background objects do not match, it is considered that new feature amounts appear due to out-of-plane rotation of the background object. At this time, it is considered that all feature amounts included in the object region as the current target form the background object.

After the above processing, based on a background object ID to be currently processed and coordinates of output feature amounts, weights of non-corresponding feature amounts in the weighted feature amount information are reduced (by, for example, subtracting a fixed amount) (step S1909).

b. Automatic Door Scene:

The first background object region selection unit selects all object regions including those which include a person as background object candidate regions. However, of course, a human body region of these regions is not a background object region. Therefore, a region detected as a human body using the human body detection unit 212 is unlikely to be a background object region. Thus, based on a background object ID to be currently processed and coordinates of a human body detection result region, weights for feature amounts corresponding to the interior of the human body detection result region in the weighted feature amount information are reduced (by, for example, subtracting a fixed amount). If a reliability of the detection result of the human body detection unit can be output, weights may be decided in inverse proportion to this reliability.

Figure 25:
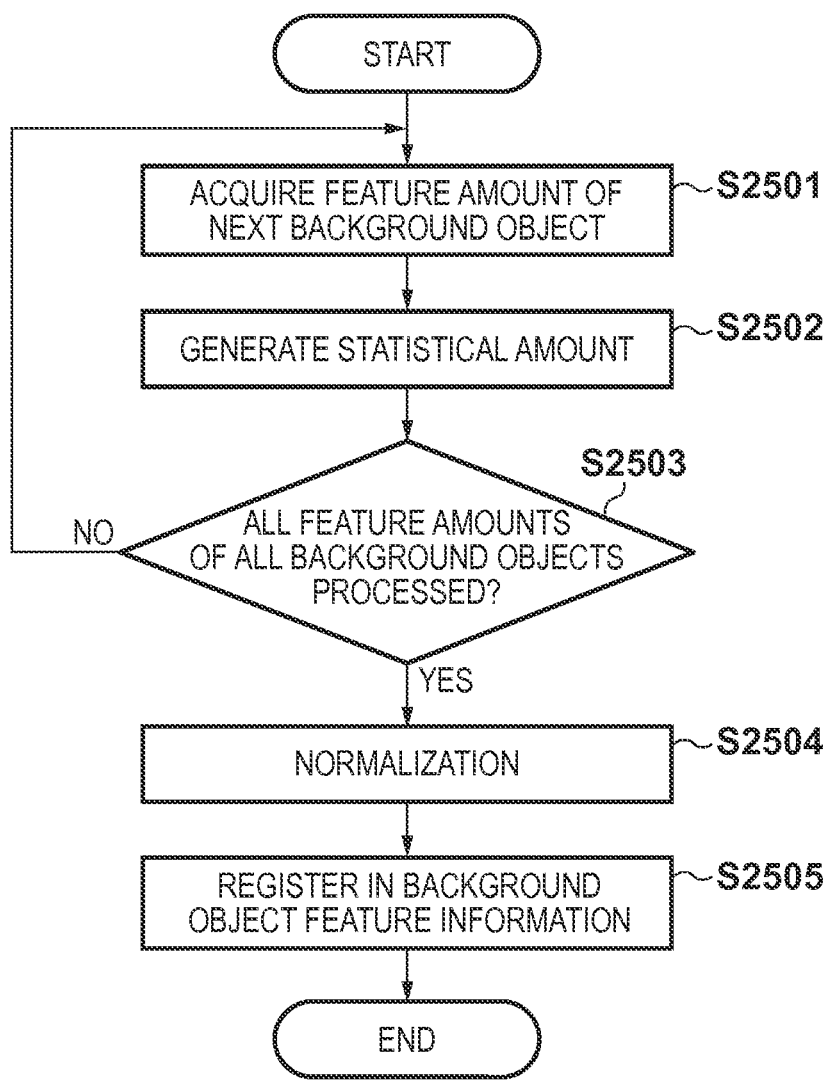
FIG. 25 is a flowchart showing the sequence of background object feature information registration processing.

Details of the background object feature information registration processing in step S309 will be described below with reference to FIG. 25.

Feature amounts included in one background object are acquired from the weighted feature amount information (FIG. 22) (step S2501).

Next, the statistical amount generation unit 216 generates a histogram from the feature amounts (step S2502). This is known as "Bag of words" in literature [J. Sivic and A. Zisserman, Video google: A text retrieval approach to object matching in videos, In Proc. ICCV, 2003.] and the like. Assume that bins of the histogram are decided in advance by the following processing. Feature amounts acquired from various videos are clustered into the predetermined number (k) by vector quantization using a k-means method on a feature amount space. Each clustered unit will be referred to as a bin hereinafter. By generating the histogram, information of an extraction position of a feature amount is lost, but a change in feature amount caused by an illuminance variation, out-of-plane rotation, and the like can be absorbed.

Note that upon calculation of the histogram, the weights calculated by the second selection unit 210 are taken into consideration, and values multiplied by the weights are used. Thus, feature amounts included in a background object region at a higher possibility are reflected more largely to this histogram (background object feature histogram).

It is checked whether or not the background object feature histogram has been generated for all feature amounts included in all background objects (step S2503). If NO in step S2503, the control returns to step S2501 to repeat generation of the background object feature histogram (step S2502). In this embodiment, one background object feature histogram is generated from all feature amounts included in all background object candidates.

The generated background object feature histogram is normalized using the total number of feature amounts multiplied by the weights (step S2504). This is because the numbers of feature amounts in the detected background object candidate regions are not constant depending on the number of background objects, out-of-plane rotation directions, and the like.

The normalized background object feature histogram is registered in the background object storage unit 218 as background object feature information (step S2505). When the background object feature information has already been stored, the two pieces of information are merged by dividing a sum total of frequency values of respective bins by 2. In this manner, the background object feature information in an installation environment (scene) of this object detection apparatus is generated from all background object candidates detected in the registration phase.

Since each background object is frequently moved during the registration phase, all possible changes are observed (detected). By generating one model based on such changes, the background model specialized to the current scene can be generated.

According to the aforementioned method, background object regions can be selected from object regions detected once. Furthermore, by calculating a histogram from feature amounts extracted from all the selected regions, background object feature information robust against changes of background objects can be generated.

[Operation Phase]

Figure 26:
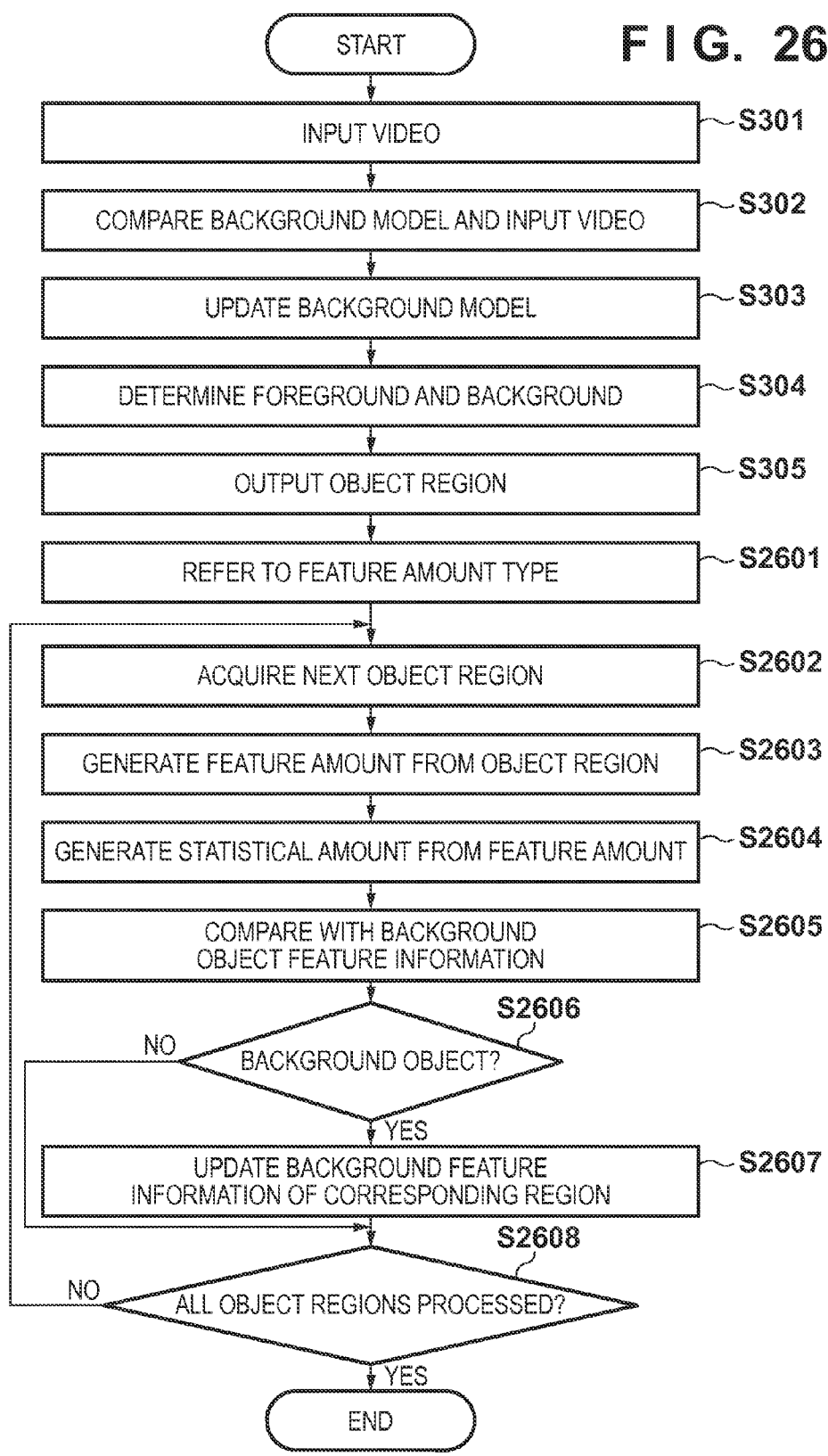
FIG. 26 is a flowchart showing the sequence of processing in an operation phase according to the embodiment.

The processing sequence of the operation phase of this embodiment for one frame image will be described below with reference to FIG. 26. The same step numbers as in FIG. 3 denote the same steps S301 to S305 as in the registration phase, and a description thereof will not be repeated.

After the processing of step S305, a feature amount type corresponding to the current scene is extracted from the scene-dependent feature amount type information (FIG. 17) in the rule storage unit 211 (step S2601). Next, one object region (coordinates thereof) is acquired from the object region information (FIG. 11) (step S2602). Then, the second feature amount extraction unit 209 extracts feature amounts according to the feature amount type from a corresponding region of an input frame image based on the acquired object region (step S2603) in the same manner as in step S307 of the registration phase. Next, a histogram is calculated based on the extracted feature amounts, thus generating a background object feature histogram (step S2604) as in step S2502 of the registration phase. Next, the background object discrimination unit 219 compares the background object feature histogram acquired from the object region to be currently processed with the background object feature information (step S2605), thus determining whether or not the object region includes a background object (step S2606).

To attain this determination step, a histogram intersection disclosed in literature [M. J. Swain and D. H. Ballard: Color Indexing, International Journal of Computer Vision, Vol. 7, No. 1, pp. 11-32 (1991)] is used as a similarity. The histogram intersection is calculated by comparing corresponding bins of two histograms, and calculating a sum total of minimum values. The similarity is compared with a predetermined threshold, and if the similarity is higher than the threshold, a background object is determined.

If a background object is determined in step S2606, the background model update unit 205 is notified of a corresponding region. Then, a corresponding region of the background model in the background model storage unit 204 is added as a background. In this embodiment, since a background and foreground (object) are determined based on durations, the time of creation of pixels included in the corresponding region in the background model are changed to that by going back from the current time by the threshold of the background conversion time. The time of creation of a state with the active flag=1 of coordinates included in the corresponding region in the background model (FIG. 5) is changed. Thus, since the corresponding region is no longer detected as an object, the background object is never erroneously detected.

It is checked whether or not the processes of steps S2602 to S2607 are complete for all detected object regions (step S2608). If regions to be processed still remain, the process returns to step S2602; otherwise, this processing ends to select the next frame image to be processed.

According to the aforementioned embodiment, even when an object is temporarily erroneously detected, if it is a background object, that object can be handled as a background, thus suppressing detection errors. In other words, objects can be handled while being distinguished into background objects originally included in the background and newly brought objects.

[Other Embodiment]

The background subtraction method in the embodiment is executed based on durations since feature amounts extracted from a video appear in the video. However, the present invention is not limited to this method, and various other methods are applicable. For example, an input frame image at an initialization timing is handled intact as a background model, and is compared with a subsequent input frame image to determine pixels that generates differences not less than a predetermined value as an object. However, in this case, a unit which calculates duration of an object is required to generate background object feature information in the aforementioned waiting room scene. Such unit can be implemented by further including a tracking unit which calculates associations based on object region positions, feature amounts, and the like detected between frames.

In the embodiment, the background object feature histogram is used as the background object feature information. However, the present invention is not limited to this. For example, background object regions may be extracted from an input image, and pixel data may be used intact.

In the embodiment, background object regions are selected by the first selection unit 208 and second selection unit 210. However, the user may make selection. For example, the following method is available. Initially, an input frame image is displayed using the display device 107, and the user designates background object regions via the input device 106. Alternatively, background object regions selected by the first selection unit 208 and second selection unit 210 are temporarily displayed using the display device 107. The user corrects the displayed background object regions via the input device 106. The statistical amount generation unit 216 may generate a background object feature histogram from the background object regions obtained by the aforementioned method.

In the embodiment, a region determined as a background object by the background object discrimination unit 219 is output to the background model update unit 205, which registers that region in the background model. Thus, subsequent detection errors are suppressed. However, a region determined as a background object may be output to the object detection region output unit 207, which may delete that region from the object region information (FIG. 9), thereby suppressing detection errors output from the object detection apparatus.

In FIG. 1, respective devices are connected via the bus 109. Alternatively, some devices may be connected via the network I/F 108. For example, the image input device may be connected via the network I/F 108. Alternatively, all units may be stored in an integrated circuit chip, and may be integrated with the image input device 105.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-183596 filed Aug. 22, 2012 which is hereby incorporated by reference herein in its entirety.

What is claimed is:

1. An object detection apparatus comprising:
    a video input unit configured to input a frame of a video;
    an object region detection unit configured to detect at least one object region by comparing a feature amount of the input frame and a feature amount of at least one background in the frame represented by background information in a background model;
    a selection unit configured to select a background object region including a background object which is originally included in the background, from the detected at least one object region by using at least one first condition to be satisfied by the background object;
    a discrimination unit configured to discriminate between a portion corresponding to the background object and a portion other than the background object in the background object region by using at least one second condition to be satisfied by a region which does not include the background object;
    a generation unit configured to generate background object feature information representing a feature amount of the background object based on feature amounts of the background object region and a result of discrimination by said discrimination unit; and
    an addition unit configured to add the background object feature information to the background model, thereby forcing said object region detection unit not to detect the background object as the object region from a succeeding frame.

2. The apparatus according to claim 1, wherein the background object feature information is a statistical amount based on feature amounts extracted from the background object region.

3. The apparatus according to claim 2, wherein the feature amounts are feature amounts according to a scene to be applied.

4. The apparatus according to claim 1, wherein one of the first conditions is based on a duration since the object region appeared in the video.

5. The apparatus according to claim 1, further comprising a moving object detecting unit configured to detect a moving object from the background object region,
    wherein one of the second conditions regards a moving object region detected by said moving object detecting unit as the region which does not include the background object.

6. The apparatus according to claim 1, further comprising a translation/rotation determination unit configured to determine whether the object region is detected as a result of parallel translation of an object or is detected as a result of out-of-plane rotation of the object,
    wherein when said translation/rotation determination unit determines that the object region is detected as a result of parallel translation, one of the second conditions regards the object region as a partial background region which appears as a result of parallel translation.

7. The apparatus according to claim 1, wherein said determination unit includes a unit configured to update the background model based on the determination result.

8. The apparatus according to claim 1, further comprising a weight adjusting unit configured to adjust weights for feature amounts of the background object region by relatively lessening a weight for a region other than the background object in the background object region, and wherein said generation unit is configured to generate the background object feature information representing a feature amount of the background object based on feature amounts of the background object region and the adjusted weights thereof.

9. The apparatus according to claim 1, wherein the background model includes, for each position in the frame, at least one background feature amount and time information indicating the time of occurrence of the at least one background feature amount, wherein the apparatus further comprises an update unit configured to, if a feature amount of a position of interest is within an acceptable error regarding one of the background feature amounts, update the background feature amount of the one with the feature amount of the position of interest, but not update the information indicating the time of occurrence.

10. The apparatus according to claim 9, wherein said update unit is configured to, if the feature amount of the position of interest is not within the acceptable error regarding anyone of the background feature amounts, add the feature amount of the position of interest as a new background feature amount corresponding to the position of interest and the time of the current frame as the information indicating the time of occurrence of the new background feature amount, into the background model.

11. A control method of controlling an object detection apparatus which comprises a video input unit configured to input a frame of a video, comprising:

an object region detection step of detecting at least one object region by comparing a feature amount of the input frame from the video input unit and a feature amount of at least one background in the frame represented by background information in a background model;

a selection step of selecting a background object region including a background object which is originally included in the background, from the detected at least one object region by using at least one first condition to be satisfied by the background object;

a discrimination step of discriminating between a portion corresponding to the background object and a portion other than the background object in the background object region by using at least one second condition to be satisfied by a region which does not include the background object;

a generation step of generating background object feature information representing a feature amount of the background object based on feature amounts of the background object region and a result of discrimination in said discrimination step; and an addition step of adding the background object feature information to the background model, thereby forcing said object region detection step not to detect the background object as the background region from a succeeding frame.

12. A non-transitory computer-readable storage medium storing a program for controlling a computer, which includes a video input unit configured to input a video, to execute respective steps of a method according to claim 11 when the computer loads and executes the program.

* * * * *